United States Patent
Abrams et al.

(10) Patent No.: US 11,710,126 B2
(45) Date of Patent: *Jul. 25, 2023

(54) HARDWARE DEVICE FOR ENTERING A PIN VIA TAPPING ON A TOUCH SCREEN DISPLAY

(71) Applicant: Fiserv, Inc., Brookfield, WI (US)

(72) Inventors: Jacob Whitaker Abrams, San Mateo, CA (US); Jeffrey Blattman, San Jose, CA (US)

(73) Assignee: FISERV, INC., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,569

(22) Filed: Apr. 25, 2022

(65) Prior Publication Data
US 2022/0253850 A1     Aug. 11, 2022

Related U.S. Application Data

(63) Continuation of application No. 17/330,287, filed on May 25, 2021, now Pat. No. 11,341,496.
(Continued)

(51) Int. Cl.
*G06F 3/048*       (2013.01)
*G06Q 20/40*      (2012.01)
(Continued)

(52) U.S. Cl.
CPC ......... *G06Q 20/4012* (2013.01); *G06F 3/016* (2013.01); *G06F 3/0488* (2013.01); *G09B 21/003* (2013.01); *G09B 21/006* (2013.01)

(58) Field of Classification Search
CPC .............................. G06F 3/016; G06F 3/0188
See application file for complete search history.

(56) References Cited

U.S. PATENT DOCUMENTS 5,185,515 A    2/1993   Nishibe
5,589,855 A   12/1996   Blumstein et al.
(Continued)

FOREIGN PATENT DOCUMENTS

AU        2019201546 A1    9/2019
CA          3061711 A1   11/2018
(Continued)

OTHER PUBLICATIONS

Extended Search Report dated Jul. 25, 2022, EP Patent Appln. No. EP 22159025.0, 9 pages.
(Continued)

*Primary Examiner* — Linh K Pham
(74) *Attorney, Agent, or Firm* — Foley & Lardner LLP

(57) ABSTRACT

A device and associated methods for entering a PIN via tapping are disclosed. The device can be configured to determine a number of taps provided by a PIN holder on a touch sensor in representation of a PIN digit and to store the number of taps as a digit in a sequence that represents the PIN. Indications for interaction with the device can be provided to PIN holders in the form of auditory cues. A visually impaired PIN holder may be able to complete a PIN entry process by following the indications for interaction, tapping on a touch sensor a number of times equal to the value of the digit of the PIN to be entered, and performing gestures mapped to commands for the device.

18 Claims, 8 Drawing Sheets

Related U.S. Application Data

(60) Provisional application No. 63/034,276, filed on Jun. 3, 2020.

(51) Int. Cl.
   *G06F 3/01* (2006.01)
   *G06F 3/0488* (2022.01)
   *G09B 21/00* (2006.01)

(56) References Cited

U.S. PATENT DOCUMENTS

| | | |
|---|---|---|
| 6,625,201 B1 | 9/2003 | Stirling-Gallacher |
| 7,146,577 B2 | 12/2006 | Hoffman |
| 8,874,912 B2 | 10/2014 | Barnett |
| 8,978,975 B2 | 3/2015 | Barnett |
| 9,082,253 B1 | 7/2015 | Harty et al. |
| 9,658,763 B2 | 5/2017 | Harty et al. |
| 9,851,890 B2 | 12/2017 | Kim et al. |
| 10,055,053 B2 | 8/2018 | Klein et al. |
| 10,255,038 B2 | 4/2019 | Chudge et al. |
| 10,429,930 B2 | 10/2019 | Day et al. |
| 10,489,567 B2 | 11/2019 | Haque et al. |
| 10,521,046 B2 | 12/2019 | Klein et al. |
| 10,732,823 B2 | 8/2020 | Gorlich et al. |
| 10,735,225 B2 * | 8/2020 | Kim .................. H04L 25/03834 |
| 10,795,573 B2 | 10/2020 | Macisaac et al. |
| 10,838,692 B2 | 11/2020 | Chudge et al. |
| 10,884,565 B2 | 1/2021 | Pavageau et al. |
| 10,891,051 B2 | 1/2021 | Klein et al. |
| 10,921,891 B2 | 2/2021 | Lin et al. |
| 2007/0198358 A1* | 8/2007 | Uehara ................ G06Q 20/325 235/380 |
| 2012/0066650 A1* | 3/2012 | Tirpak .................... G06F 21/36 715/863 |
| 2012/0166944 A1* | 6/2012 | Cotterill ............... G06F 3/0483 715/702 |
| 2012/0319956 A1 | 12/2012 | Talach et al. |
| 2013/0113709 A1* | 5/2013 | Wine ...................... G06F 1/163 345/169 |
| 2014/0173505 A1* | 6/2014 | Urakawa ............... G06F 3/0488 715/784 |
| 2014/0223549 A1* | 8/2014 | Quintanilla ............ G06F 21/31 726/19 |
| 2014/0247237 A1* | 9/2014 | Chan .................. G06F 3/04883 345/174 |
| 2015/0026613 A1 | 1/2015 | Kwon et al. |
| 2015/0121510 A1 | 4/2015 | Gauteron et al. |
| 2015/0161836 A1* | 6/2015 | Park ........................ G06F 21/36 340/5.51 |
| 2015/0177270 A1 | 6/2015 | Takano et al. |
| 2015/0205379 A1 | 7/2015 | Mag et al. |
| 2015/0248196 A1* | 9/2015 | Kadomatsu ......... G06F 3/04842 715/765 |
| 2016/0224113 A1 | 8/2016 | Day et al. |
| 2017/0329510 A1* | 11/2017 | Görlich .................. G06F 3/016 |
| 2017/0357321 A1 | 12/2017 | Fleizach et al. |
| 2018/0095588 A1 | 4/2018 | Klein et al. |
| 2018/0203600 A1* | 7/2018 | Hajimusa ................ G06F 21/45 |
| 2018/0260108 A1 | 9/2018 | Hajimusa et al. |
| 2018/0341757 A1* | 11/2018 | Haque .................. G06F 21/316 |
| 2019/0064949 A1* | 2/2019 | Blanc .................... G06F 3/0412 |
| 2019/0179438 A1* | 6/2019 | Benkley, III ............ G06F 3/044 |
| 2019/0213306 A1* | 7/2019 | Caselles .................. G06F 21/32 |
| 2019/0369870 A1 | 12/2019 | Marsden et al. |
| 2020/0326841 A1* | 10/2020 | Griffin .................... G06T 11/60 |
| 2020/0379621 A1* | 12/2020 | Sartori .................. G06F 3/0488 |
| 2021/0089206 A1 | 3/2021 | Klein et al. |

FOREIGN PATENT DOCUMENTS

| | | |
|---|---|---|
| CA | 3046511 A1 | 12/2019 |
| CN | 103885705 A | 6/2014 |
| CN | 110262671 A | 9/2019 |
| CN | 111127780 A | 5/2020 |
| CN | 111580737 A | 8/2020 |
| CN | 112000273 A | 11/2020 |
| EP | 2713304 A1 | 4/2014 |
| EP | 3520054 A1 | 4/2018 |
| EP | 2746925 A2 | 8/2018 |
| EP | 2810154 A1 | 3/2019 |
| EP | 3540573 A1 | 9/2019 |
| EP | 3582090 A1 | 12/2020 |
| EP | 3 920 059 | 12/2021 |
| ES | 2845250 T3 | 7/2021 |
| FR | 3082641 A1 | 12/2019 |
| FR | 3097350 A1 | 12/2020 |
| GB | 2591201 A | 7/2021 |
| GB | 2591903 A | 8/2021 |
| GB | 2592201 A | 8/2021 |
| JP | 6328921 A | 5/2018 |
| JP | 6931065 B2 | 9/2021 |
| KR | 102007651 B1 | 8/2019 |
| KR | 102108972 B1 | 5/2020 |
| WO | WO-2018/067605 A1 | 4/2018 |
| WO | WO-2018/217319 A1 | 11/2018 |
| WO | WO-2020/249787 A1 | 12/2020 |
| WO | WO-2021/014177 A1 | 1/2021 |
| WO | WO-2021/165683 A1 | 8/2021 |

OTHER PUBLICATIONS

European Extended Search Report dated Oct. 10, 2021, European Patent Application No. 21176377.6, 8 pages.

He et al., Visual Step PIN Pad: Towards Foot-Input Authentication Using Geophones; 2020; IEEE; 9 pages.

Zeng et al., You are How You Touch: User Verification on Smartphone via Tapping Behavior; 2014; IEEE; 12 pages.

* cited by examiner

100

HARDWARE DEVICE FOR ENTERING A PIN VIA TAPPING ON A TOUCH SCREEN DISPLAY

CROSS-REFERENCE TO RELATED PATENT APPLICATIONS

This application is a continuation of U.S. application Ser. No. 17/330,287, filed on May 25, 2021, which in turn claims priority from U.S. Provisional Patent Application No. 63/034,276, filed on Jun. 3, 2020, the entireties of which are incorporated by reference herein.

BACKGROUND

Personal Identification Numbers (PIN) are widely used for a variety of applications that require identity verification. As the use of touch surfaces increased, it became common to provide interfaces for PIN entry that make use of touch technology. Touch surfaces, such as touch screen displays, generally rely upon a user's visual sensing ability to interact with the interface provided by the display. Problems arise for visually impaired users using a touch screen display device as they cannot sense the user interface visually.

Visually impaired users usually rely on tactile and auditory sensing abilities to discern the information being presented. For example, a visually impaired user can identify the locations of keys on a keyboard and interpret the characters or commands of those keys if the keyboard configuration is taught, or previously known. This is not possible with a touch screen display that has a smooth contact surface. The addition of tactile guides to a touch screen display surface is one solution. However, that approach does not resolve the plurality of issues that visually impaired users face. For example, inadvertent and undesired touch inputs can be registered on the touch screen display as the tactile guides are used to find the touch points of interest.

Furthermore, visually impaired users cannot verify their user inputs using touch point signifiers alone. One solution is to include an audio device with the touch screen application to read-back the user input aloud. This approach, while simple to implement, can inappropriately share private information with others nearby if in a public setting.

A point of sale (POS) terminal is an example of an application for a human machine interface where it is important for an individual user to operate the interface without assistance from another party. This is because POS terminals will often need to accept sensitive information from a user. The average user will have no difficulty utilizing a touch user interface to enter their PIN to authorize a transfer of funds using the POS terminal. However, a visually impaired person will have no way to enter their PIN on that same user interface, because they will not know where the numbers are displayed to accept their selection. In these situations, the user will need to provide their PIN to a clerk which provides a disadvantageous security situation in that both the clerk, and potential eavesdroppers, will be able to obtain the user's PIN.

A comprehensive solution is necessary to provide a robust and secure user input process for visually impaired users while maintaining the advantages afforded to visually able users.

SUMMARY

This disclosure relates to devices and associated methods for PIN entry via user interactions, such as taps and other gestures. Throughout this disclosure, references to a "PIN holder" will refer to the person conducting the PIN entry using the device, references to the "device administrator" will refer to a person who is assisting with the operation of the device, and both classes of actors can be referred to as "users." The present invention provides a solution for visually impaired users that are not able to use regular techniques, such as pressing dedicated visually displayed buttons on featureless touch screens to enter a PIN to authenticate their identity or their authorization to access secure information.

In specific embodiments of the invention, the solution can include a device that provides indications for interaction to the user for executing an action where there is no need to be visually aware of the user interface, such as tapping anywhere on a surface, performing a gesture, providing a voice command or otherwise interacting with the device for completing a PIN entry. The indications for interaction can be provided via auditory cues, haptic cues, braille instructions, or other vial suitable for a visually impaired PIN holder, or even messages on a screen for a device administrator assisting the PIN holder during the operation. In specific embodiments of the invention, the indications for interaction can be provided directly by the device administrator.

A device in accordance with specific embodiments of the present invention can include various means for outputting and inputting information so that fluid communication can be established between the device and the users of the device. The means for outputting information can include any means for conveying information from the device to the users, such as speakers to provide auditory cues, displays to provide visual cues, features to provide haptic cues, etc. Instructions such as the indications for interaction, or information on the progress of the operation can be provided to the user through the various means for outputting information. The means for inputting information can include any means for conveying information from the users to the device, such as touch surfaces to detect user's interactions, gesture detectors such as cameras and sensors to detect user gestures and map them to specific commands, or microphones to recognize voice commands from the user.

In specific embodiments of the present invention, the device includes processing logic to carry out methods that allow for the device to provide the functionalities that will be described in detail in this disclosure. The processing logic can be implemented by one or more processors in the device. The one or more processors may have access to one or more memories and/or other computer readable mediums, either locally on the processors or external to the processors, storing instructions that, when executed by the processors cause the device to conduct various actions as will be disclosed herein.

In specific embodiments of the present invention, the device will be able to provide an indication for interaction through the means for outputting information, such as a voice cue using a speaker, and determine, using the processing logic, a digit of a PIN based on the user's interactions through the means for inputting information, such as taps on a touch display. Therefore, the device of the present invention and methods associated thereof provide visually impaired PIN holders with a possibility for securely completing a PIN entry process without having to share their PIN numbers with a third party.

In accordance with specific embodiments of the invention, the PIN holder can be provided with an intuitive path to complete the PIN entry. In some embodiments, the device will ask the user, through an indication for interaction such as an auditory cue, to introduce a first digit of a PIN by tapping on a touch surface a certain number of times equal to, or representative of, the value of the digit of the PIN to be inserted. This mode of operation will also be referred throughout this disclosure as tally tap PIN entry mode. In specific embodiment of the invention, the device can be configured to hold for a predetermined period of time before determining the number of taps provided by the PIN holder, so that the PIN holder is able to comfortably introduce the correct number of taps before the time expires. For example, the device can be configured to hold for a period of time large enough so that an average visually impaired PIN holder is able to introduce 9 taps, which is the biggest possible digit for a PIN and thus a potential worst-case hold time scenario (unless the system is configured to receive entries of more than 9 taps, such as in a case where the digit zero is to be entered by taping ten times instead of zero times). The processing logic on the device can be responsible for setting a timer and control the hold period, as will be described below in more detail.

In specific embodiments of the invention, the user may also be able to provide entries other than PIN digits to the device in various ways and through various means. For example, the device can provide the user with options for deleting an entered digit, canceling the PIN entry process, or finishing a PIN entry process, among other commands. In such cases, the device can be configured to map actions or gestures from the user, such as swipes in different directions or long presses of different duration, to certain commands, such as delete, cancel, or finish. The device can be configured to determine different gestures or actions of the user in association with the commands and execute the corresponding command. As another example, the device may be able to recognize voice commands from the user.

Instructions on how to interact with the device can be provided as part of the indications for interaction. Those instructions can include a description of all the commands the user can enter when interacting with the device and the specific action or gesture that will trigger the command. The instructions can be provided to the user before the user starts interacting with the device or throughout the process as they may be needed. In this way, the user may be able to successfully complete a PIN entry process by individually interacting with the device.

In specific embodiments of the invention, one or more non-transitory computer-readable media is provided. The one or more non-transitory computer-readable media store instructions which, when executed by one or more processors in a device, cause the device to: provide, using a speaker on the device, an auditory cue; initiate, after providing the auditory cue, a hold period of a predetermined duration; receive a set of zero or more taps provided on a touch sensor on the device during the hold period; determine a number of taps in the set of zero or more taps; and store, after the conclusion of the hold period, a value in a sequence based on the number of taps.

In specific embodiments of the invention, a device is provided. The device includes a speaker, a touch sensor, at least one processor, and non-transitory computer-readable media accessible to the at least one processor and storing instructions which, when executed by the at least one processor, cause the device to: provide, using the speaker, an auditory cue; initiate, after providing the auditory cue, a hold period of predetermined duration; receive a set of zero or more taps provided on a touch sensor on the device during the hold period; determine a number of taps in the set of zero or more taps; and store, after the conclusion of the hold period, a value in a sequence based on the number of taps.

In specific embodiments of the invention, one or more non-transitory computer-readable media is provided. The one or more non-transitory computer-readable media store instructions which, when executed by one or more processors in a device, cause the device to: provide, using an actuator on the device, a haptic cue; initiate, after providing the haptic cue, a hold period of predetermined duration; detect a number of taps in a set of zero or more taps provided on a touch sensor on the device during the hold period; and store, after the conclusion of the hold period, a digit in a sequence based on the detecting of the number of taps.

DETAILED DESCRIPTION

Devices and methods related to PIN entry via user interactions, such as tapping, in accordance with the summary above are disclosed in detail herein. The devices and methods disclosed in this section are nonlimiting embodiments of the invention, are provided for explanatory purposes only, and should not be used to constrict the full scope of the invention.

In specific embodiments of the invention, a device is provided. The device can include processing logic implemented by one or more processors in the device in communication with one or more non-transitory computer-readable media. The one or more non-transitory computer-readable media can store instructions to be executed by the processors to carry out methods that allow for the device to provide the diverse functionalities described herein. The device can also include various means for outputting information and means for inputting information so that fluid communication between the device and the users of the device, including visually impaired PIN holders and device administrators, is established.

Figure 1A:
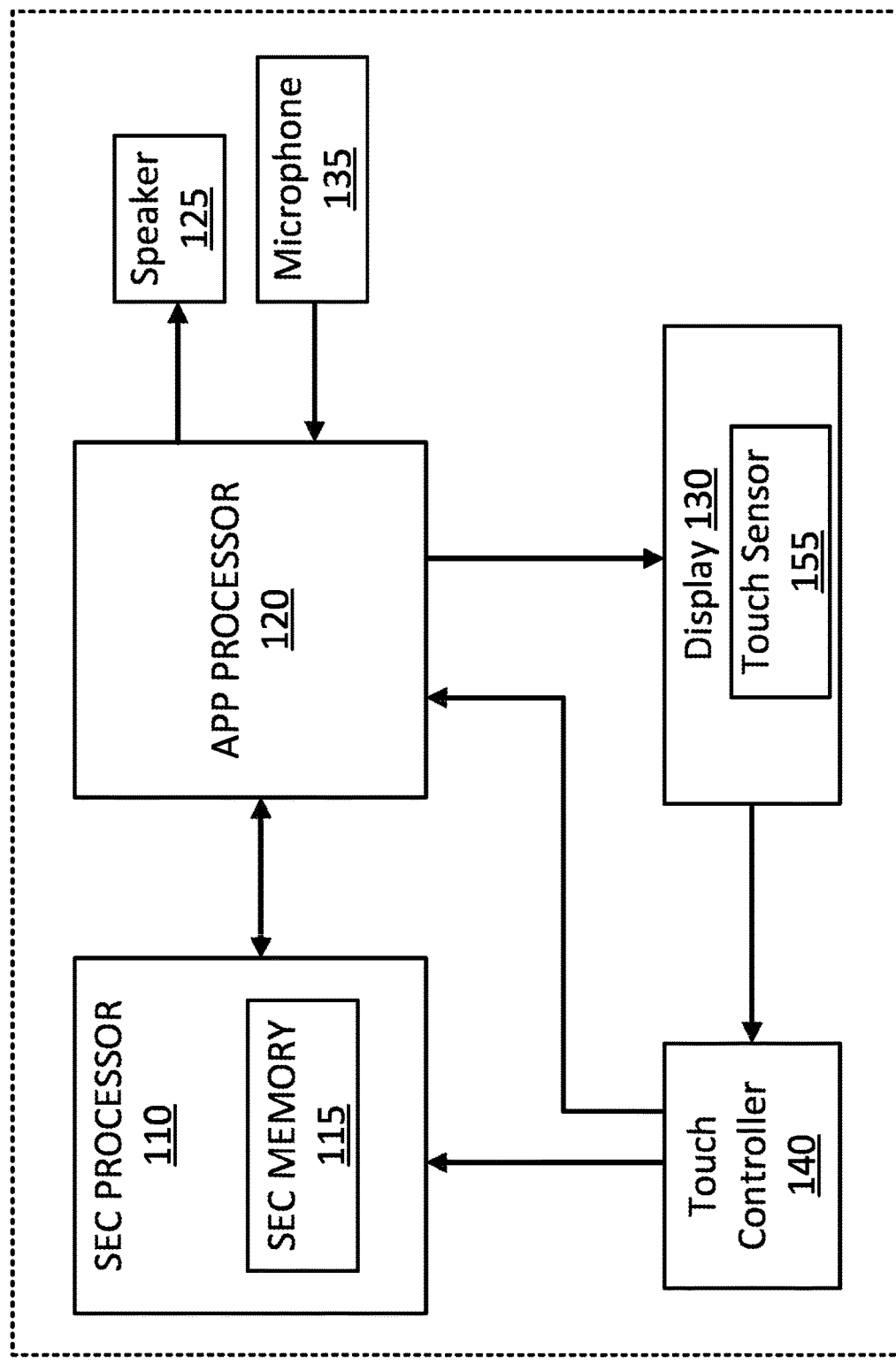
FIG. 1A illustrates a schematic view of a device in accordance with specific embodiments of the invention disclosed herein.

FIG. 1A illustrates a schematic view of a device 100 in accordance with specific embodiments of the present invention. As mentioned before, a device in accordance with specific embodiments of the present invention can include processing logic that can be implemented by one or more processors in the device in communication with computer readable mediums. In the example of FIG. 1A, the device 100 includes a secure processor 110 in operative communication with an applications processor 120. In alternative embodiments, the actions of secure processor 110 and applications processor 120 can be executed by a single processor, for example by providing a secure partition on applications processor 120.

An applications processor, such as applications processor 120, can be responsible for instantiating an operating system for the device and handling the interaction of the secure processor with the different means for outputting and inputting information. The applications processor can be a master processor for device 100. The applications processor can be the processor of an applications microprocessor located on a printed circuit board in the device. The applications processor can be a commercially available processor able to instantiate an operating system for the device and handle the interaction of the secure processor with the different means for outputting and inputting information. The applications processor can be a microcontroller and include internal storage. The applications processor can also have access to one or more external memories with stored instructions to be executed by the applications processor for controlling the various means for inputting and outputting information and the interaction of the secure processor with the other components in the device.

A secure processor, such as secure processor 110, can be responsible for secure operations on the device, such as handling payment information and the PIN entry process. The secure processor can be the processor of a secure microprocessor located on a printed circuit board in the device. The same printed circuit board can include the applications microprocessor as described above. The secure processor can be a secure microcontroller and include internal secure storage, such as secure memory 115. The secure processor can include various system instructions and sensitive information stored in the secure memory.

A secure memory, such as secure memory 115, can be an integral component of the secure processor such as embedded flash memory or integrated ROM memory. The secure memory can be used to store data used in the execution of the methods disclosed herein as well as computer executable instructions necessary to enable a processor to carry out the methods disclosed herein. The secure memory can take on various forms. The secure memory can be integrated with the secure processor and include ROM, EPROM, or E2PROM memories integrated with the secure processor. For example, the secure memory could be a combination of ROM and embedded flash memory. The secure memory could store instructions for executing algorithms that are meant for execution by the secure processor to perform the methods disclosed herein. Furthermore, the secure memory could comprise multiple components such as memory integrated on the secure processor as well as separate memories accessible to, but not integrated with the secure processor. The secure memory could be part of a memory system that likewise included numerous physical components.

Device 100 can also include various means for outputting information to the users of the device. The means for outputting information can include any means for the device to communicate or externalize information, such as user interfaces or dedicated hardware. In the example of FIG. 1A, the means for outputting information include speaker 125 for providing auditory cues, voice commands or indicative sounds, and display 130 for providing visual information. When the user utilizing the device is a visually impaired PIN holder, information presented on the display can be used by a device administrator assisting in the operation of the device. The device can be configured to provide indications for a user through the means for outputting information. For example, information outputted can be a voice or other auditory cue that indicates a visually impaired PIN holder how to enter a PIN, or a prompt on a screen that informs the device administrator that the system is ready for receiving a PIN, so that the device administrator can instruct the PIN holder accordingly.

Device 100 can also include various means for inputting information into the device. The means for inputting information can include any means for communicating or introducing information to the system of the device, such as user interfaces or dedicated hardware. In the example of FIG. 1A, the means for inputting information include microphone 135 and display 130. Display 130 can include a touch sensor 155 so that display 130 is a touch display. In this way, display 130 can be not only intended for displaying information but also serves as a tool for a user to interact with device 100. Other means for inputting information can be provided as necessary, for example buttons, touch surfaces, or gesture detectors such as gesture sensors or cameras. A user of the device may be able to interact with the device in numerous ways through the means for inputting information, such as by tapping on display 130 to enter a PIN digit (in a tally tap PIN entry mode), or by providing a voice command through microphone 135 to take a certain action.

The means for outputting and inputting information can involve dedicated or shared resources. For example, display 130 as illustrated in FIG. 1A serves both proposes, and can be used for providing prompts to a device administrator assisting in a transaction and for receiving touch coordinates from a PIN holder entering a PIN.

The applications processor can manage the means for outputting information. In this way, the secure processor can be isolated from the means for outputting information, which can improve the security of the system as there are fewer ways for the PIN to be extracted from the secure processor. For example, audio outputs (such as the auditory cues mentioned in this disclosure) can be managed by the application processor. In specific embodiments of the invention, the applications processor can provide the outputs based on Remote Procedure Calls (RPC) responses returned by the secure processor during the PIN entry process. The content to be displayed on the display can likewise be controlled by the applications processor. The screen can display text indicating that the device is in tally tap PIN entry mode and can display asterisks or other indications to indicate the number of digits completely entered so far, as will be described below in more detail.

A touch controller, such as touch controller 140, can be provided with the device to manage the touch information sensed by touch sensor 155 on display 130. Both secure processor 110 and applications processor 120 can be in communicative connection with touch controller 140. The device can be configured such that touch coordinates for non-secure operations, such as adjusting the configurations of the screen, are routed directly to the applications processor, and touch coordinates for secure operations, such as entering a PIN, are routed directly to the secure processor. The device can be configured such that the communicative connection between secure processor 110 and touch controller 140 does not pass through applications processor 120. For example, the device can be configured such that all touch data from the touch controller is first routed to the secure processor 110 and is only routed onward to applications processor 120 if it is determined that the touch controller 140 is not being used to provide payment information to the device. As another example, the device can be configured to change a routing state for the touch data between being routed to the applications processor 120 and the secure processor 110 based on a detected mode in which the device was operating. In specific embodiments of the invention, data could be routed directly to the applications processor 120 in an unsecure mode and to the secure processor 110 in a secure mode. The applications processor 120, or an application running therein, could be configured to transmit a command, such as an accessibility sequence entry commencement command, to the secure processor 110 to indicate that sensitive data, such as a PIN, is to be entered on the screen now. The data from the touch sensor could be routed to the secure processor after the command is received by the secure processor. In specific embodiments of the invention, the secure processor can send an acknowledgment of the command to indicate that the device is now in a sensitive data entry mode.

Figure 1B:
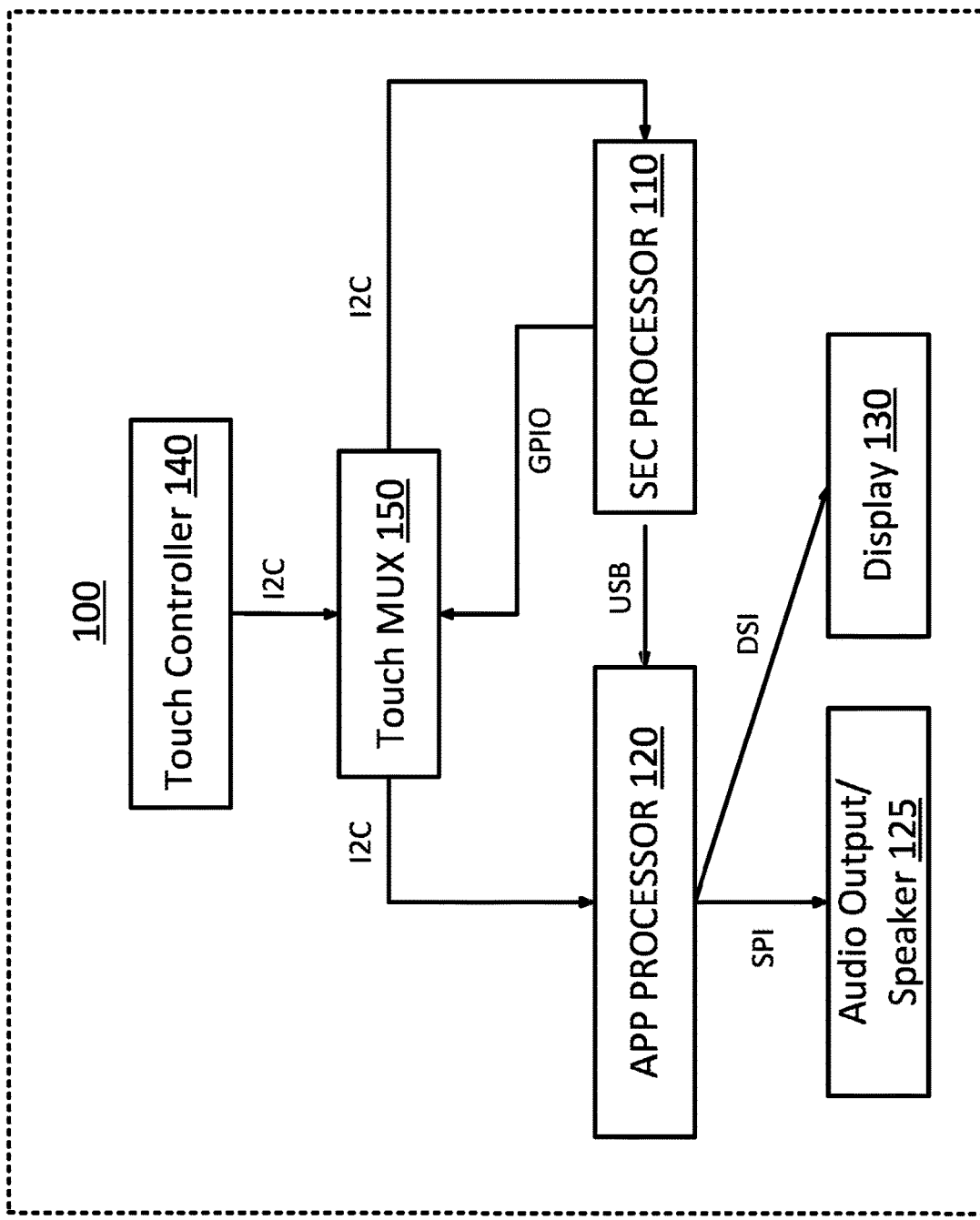
FIG. 1B illustrates a schematic view of an implementation of the device of FIG. 1A including a multiplexer, in accordance with specific embodiments of the invention disclosed herein.

In order for the touch data to be routed to the appropriate element of the system, in specific embodiments of the invention the touch controller can be associated with a multiplexer. FIG. 1B illustrates a schematic view of an implementation of the device 100 of FIG. 1A, including a multiplexer 150. The multiplexer can be implemented by the touch controller or as a dedicated hardware element within the device. In FIG. 1B, the arrows indicate the possible flow of data. The touch controller 140 can receive touch inputs from a touch sensor, such as touch sensor 155 of FIG. 1A, which can be located for example on a display such as display 130. The data can then be sent to multiplexer 150 and further forwarded to the respective secure processor 110 and/or applications processor 120 depending on the type of data, the mode the device is operating on, the specific instructions to be executed by the device, etc.

As illustrated, the secure processor 110 can not only receive data from the multiplexer 150 but also send data such as commands to change the status of the multiplexer. For example, the secure processor could control the flow of data from the multiplexer so that secure data is not sent to the applications processor. For example, when the applications processor, or an application running therein, sends a command such as the such as the accessibility sequence entry commencement command, the secure processor can switch the status of the multiplexer so that data is now routed to the secure processor.

FIG. 1B also illustrates examples of interface types that can be used for communication between the different components of the device, such as I2C, GPIO, USB, SPI and DSI. However, all interface types described can be replaced with viable alternatives, depending for example on design constraints, supply chain requirements, component availability, etc. For example, SPI could be used in place of USB and vice-versa.

Various components of the device can be involved for the touch data to be processed within the device in different ways (for example when a tally PIN entry routine is running on the device 100 as opposed to when the display is being user to input/output non-sensitive information). For example, the application processor (e.g. 120), secure processor (e.g. 110), touch controller (e.g. 140), touch mux (e.g. 150), display (e.g. 130), and audio output (e.g. 125) can be involved in the process. During a payment process, for example, the applications processor can ask the secure processor to go into a tally tap PIN entry mode. This could be done via a specific command such as the accessibility sequence entry commencement command explained before in this disclosure. In embodiments in which the applications processor and the secure processor are connected via an USB interface, such as in the example of FIG. 1B, the applications processor can communicate with the applications processor for example via RPC messages over USB. The communication can also be performed via any other viable alternative technology. The secure processor 110 can use a GPIO wired to the multiplexer 150 that can control where touch data flows, as illustrated in the example of FIG. 1B.

As the touch data can be sensitive data such as a PIN number, it may be beneficial to keep that data secure. In specific embodiments of the invention and as illustrated in the example of FIG. 1B, touch data can flow to either the secure processor 110 or the applications processor 120, and only the secure processor 110 can switch the flow via the touch multiplexer. In specific embodiments of the invention, a mechanism used to secure the taps and PIN used during the tally tap PIN entry implementation can involve the secure processor switching the touch controller data to feed into the secure processor itself, where the applications processor receives no touch data until PIN entry is complete. In specific embodiments of the invention, the secure processor does not send the digits or touch data to the applications processor. Instead, the secure processor can notify the applications processor of the status of the entry process so that the applications processor can perform actions thereafter.

In specific embodiments of the invention, the format of the touch data can be vendor specific and can depend on the vendor of the touch controller. In specific embodiments of the invention, RPC messages can be encoded in tag-length-value format (TLV), however TLV could be replaced with any other message encoding such as XML, JSON, etc.

When the PIN entry begins the secure processor can trigger the multiplexer to switch so that the secure processor now receives all touch data from the touch controller. The applications processor can periodically send messages, such as RPC messages, requesting information about the state of the PIN entry process. The secure processor can return relevant events (for example also via RPC messages or other signals) as they occur, such as "first digit entered", "second digit entered", "cancelled" or "pin entry complete". In response to those messages, the applications processor could then provide some feedback to the users or otherwise output information via the means for outputting information. For example, the applications processor could manage the display of the device so that an asterisk is displayed every time that a signal is received from the secure processor that a digit has been entered. As another example, the applications processor could manage the speaker of the device so that an auditory message is played every time that a signal is received from the secure processor that a digit has been entered. In this way, the applications processor can manage the components of the device during the PIN entry process while keeping them isolated from the secure processor where the sensitive data is being processed.

The secure processor can use the touch data to determine the PIN digits and can encrypt the PIN once it is fully entered. The secure processor can receive touch events during PIN entry and convert the touch events into PIN digits (e.g. numbers). The secure processor can send encrypted information to the applications processor which can be passed along, for example to a payment gateway, and eventually to a card issuer where it can be decrypted and verified. In specific embodiment of the invention, the applications processor never has access to unencrypted sensitive data and therefore the management of the means for outputting information can be performed securely and isolated from the sensitive data itself.

The components shown and explained with reference to device 100 of FIGS. 1A and 1B are non-limiting. Device 100 can include additional components and be connected to peripherals that are useful for the overall intended performance of the device. For example, if device 100 were a POS device, it could also include various payment interfaces, such as NFC or ICC interfaces or a magnetic stripe reader (MSR), and diverse peripherals, such as a bar code scanner or external payment interface device. Additionally, although components of device 100 were shown as part of a unitary device, they can be distributed in a plurality of discrete devices. For example, the processing core can be the main component of the device and all means for outputting or inputting information can be peripherals connected to the main core. As another example, the device can be a discrete device that can be coupled to an existing system so that the system can be augmented with the disclosed functionalities. The display can be a display of a personal user device being used in combination with device 100. The audio output 125 can be a personal speaker or headphones connected to device 100.

In specific embodiments of the invention, a method for entering a PIN via user interactions is provided. The method can be implemented by a device, such as device 100 of FIGS. 1A and 1B. The method can be explained with reference to FIG. 2.

Figure 2:
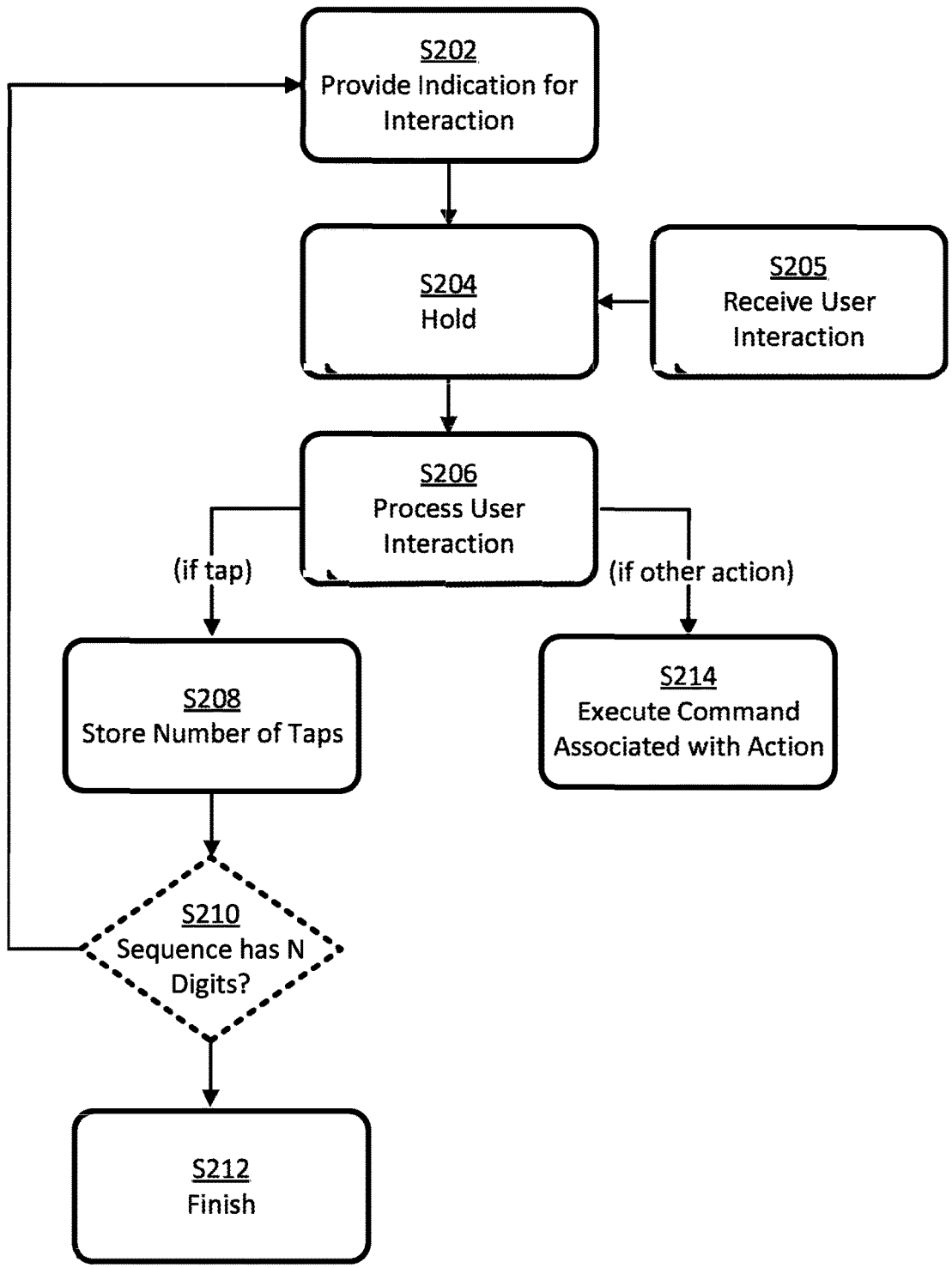
FIG. 2 illustrates a flow chart of a set of methods for entering a PIN in accordance with specific embodiments of the invention disclosed herein.

FIG. 2 illustrates a flow chart 200 of a method for entering a PIN. Flow chart 200 starts with step S202 of providing an indication to a PIN holder for interaction with the device. The PIN holder can be, for example, a visually impaired PIN holder, and the indication for interaction can be an auditory cue, giving the PIN holder instructions to enter a PIN. The auditory cue can be provided using a speaker, such as speaker 125 of FIGS. 1A and 1B. Applications processor 120 can be responsible for issuing the auditory cue when secure processor 110 starts a PIN entry mode. Additionally or in combination, a different indication for interaction can be provided. For example, a message can be displayed on display 130 giving instructions to enter a PIN. In the case where the PIN holder is a visually impaired PIN holder, such message can be intended for a device administrator to assist in the process of entering the PIN. The message can persist visibly on the display and/or on a separate device administrator screen throughout the process for assistance when necessary. As another example, the indication for interaction can be provided in the form of braille instructions. In specific embodiments of the invention where the device administrator is trained to operate the device, indications for interaction can be provided directly by the device administrator. In those embodiments, the device will not need additional hardware such as speakers for providing indications, and the process can be faster and personalized.

The indication for interaction can provide any kind of instructions for the PIN holder on how to interact with the device to introduce the PIN. The PIN holder can interact with the device in numerous ways. For example, the device can be programmed to detect user interactions such as taps, touches for predetermined periods of time, swipes in different directions, gestures, voice commands, etc. and perform a certain action in response to the user interaction detected by the device. The PIN holder may be able to enter a PIN digit by tapping on a touch sensor of the device a number of times equal to the value of the PIN digit to be entered (for example when the device is in a tally tap PIN entry mode). A PIN holder may be able to input additional commands during the PIN entry process, such as commands to cancel, finish, and/or erase. In embodiments in which the user enters a PIN digit via tapping, those additional commands can be provided, for example, by swipes in different directions as opposed to taps, or by holding a finger down. As another example, commands can be provided by voice commands from the PIN holder that the device is able to identify, for example, voice commands entered to the device through microphone 135 of device 100 in FIGS. 1A and 1B.

User actions or gestures can be mapped to commands to be executed by the device in no specific order as long as clear instructions are given to the PIN holder on what action or gesture to provide when a certain command is desired. A non-exhaustive list of possible user actions or gestures include taps, swipes in different directions, such as swipe right, swipe left, swipe up or swipe down, long presses as oppose to taps, such as holding a finger down until the device determined the command was entered, or voice commands such as saying "delete" to delete, "cancel" to cancel, "finish," "done," or "enter" to finish, "yes" to confirm, "no" to reject, etc. A non-exhaustive list of possible commands that can be mapped to the user's actions or gestures include entering a PIN digit, deleting, canceling, finishing, requesting instructions, skipping instructions, repeating instructions, confirming, rejecting, or moving back and forward through the PIN entry process.

In specific embodiments of the invention, a PIN holder, such as a visually impaired PIN holder, can be able to input commands at any time during the PIN entry process. A list of possible commands a PIN holder may be able to introduce throughout the PIN entry process and the associated action or gesture can be provided at the beginning of the PIN entry process as part of the initial indication for interaction, or throughout the process as needed by the user. The user's actions or gestures can be mapped to the commands for the device on a one-to-one basis so that one action is unambiguously mapped to only one command on each instance of the process. This mapping can be provided by the device manufacturer or be set up at the device administrator's discretion.

In order for the PIN holder to enter the right commands and successfully complete the PIN entry process, the indication for interaction provided in step S202 of flow chart 200 in FIG. 2 should be clear and efficient. For example, and considering the case where the indication for interaction is an auditory cue, the auditory cue can instruct the PIN holder to enter a digit of the PIN by tapping on a touch display a certain number of times equal to the value of the digit of the PIN to be entered. As another example, the auditory cue can instruct the PIN holder at the beginning of the PIN entry process about the time limits for introducing PIN digits, such as the time in seconds the PIN holder will have to introduce a PIN digit by tapping the display. As another example, the auditory cue can instruct the PIN holder on how to introduce specific digits, for example, the auditory cue can instruct the user not to tap, to tap ten times, or to hold a touch if the digit is "0". The auditory cue could additionally give the user instructions about the specific commands to cause the device to behave in a certain way. For example, the auditory cue could inform the user about different swiping or hold options to finish the PIN entry process, to cancel the PIN entry process, or to delete a digit entered, as described above. Alternatively or in combination, the auditory cue could inform the PIN holder about voice commands the PIN holder can use to indicate a desired action, such as for example "to delete, say delete". The auditory cue can additionally provide instructions on a gesture the PIN holder can execute if the PIN holder wishes to repeat the instructions or part of the instructions.

In cases where the indication for interaction is an auditory cue, a user of the device may be able to select the language. For example, the language can be selected by a device administrator when setting up the PIN entry procedure, or by a PIN holder via gestures or voice commands. The user may likewise be able to control the volume or speed of the auditory cue. The user may also be able to skip the instructions if they are not necessary, for example, if the PIN holder is a non-visually despaired PIN holder or if the PIN holder is already familiar with the process.

The touch surface that a PIN holder will interact with to complete a PIN entry should be sized so that a visually impaired PIN holder can easily access it. In specific embodiments of the invention where the touch surface is a touch display, such as display 130 of FIG. 1A, the entire screen or a great majority may be reserved for PIN entry when the device is on a PIN entry mode, so that the PIN holder can freely touch anywhere in the display to complete the PIN entry process.

Figure 7A:
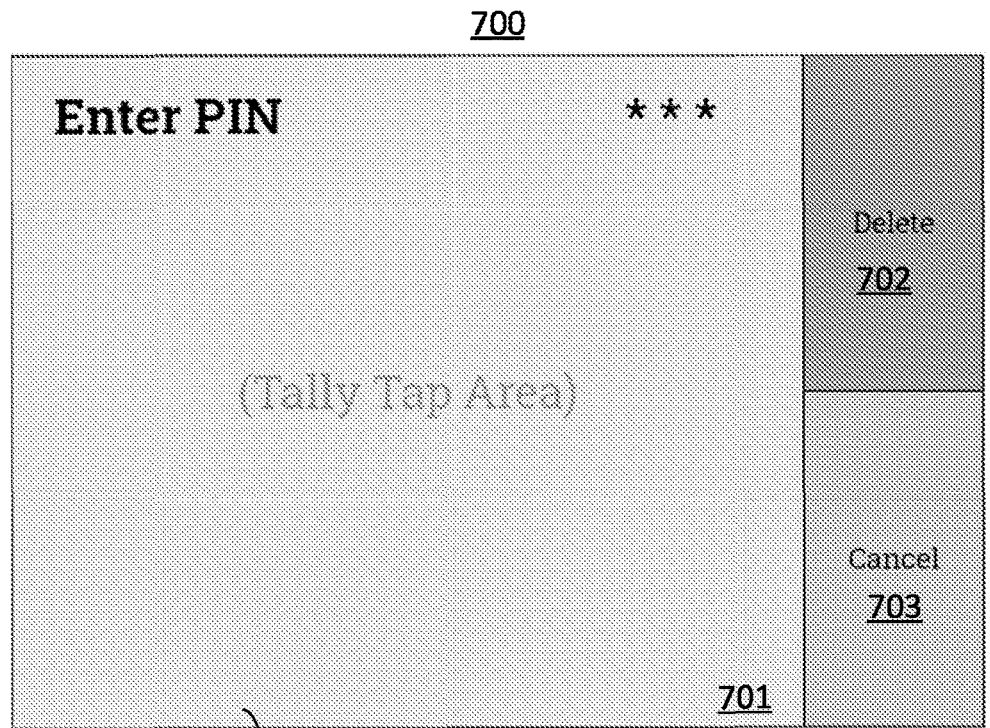
FIG. 7A illustrates an example of a tally tap PIN entry screen layout that includes a tally tap area in accordance with specific embodiments of the invention disclosed herein.

Depending on the final design the screen may display buttons such as cancel and/or delete. The screen can be observed by low-sight individuals or assistants to confirm the state of the payment and PIN entry process. FIG. 7A illustrates an example of a tally tap PIN entry screen layout 700 that includes a tally tap area 701, which can be the surface associated with the touch sensor, and other buttons such as a delete 702 and a cancel 703 button. In specific embodiments of the invention, the delete and cancel buttons may be moved to different locations or removed completely and replaced with gestures. Other buttons could be also provided if necessary.

Figure 7B:
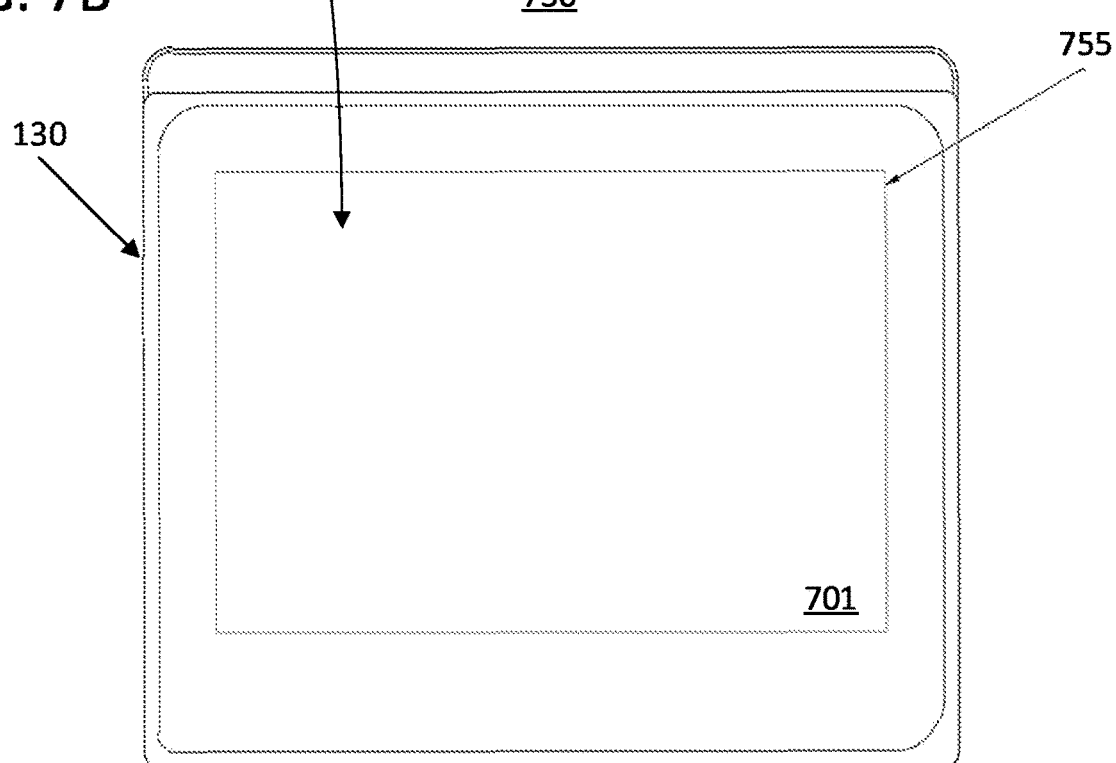
FIG. 7B illustrates a representation of a display that includes a tactile feature surrounding the touch display in accordance with specific embodiments of the invention disclosed herein.

Specific embodiments of the invention include one or more tactile features surrounding the touch display to distinguish an edge of the touch display from a surface of the device. For example, FIG. 7B illustrates a representation 750 of a display, such as display 130 of FIGS. 1A and 1B, that includes a beveled edge 755 which can help a visually impaired person locate the touch surface. The tally tap area 701 can be located within the beveled edge 755 such that it can be easily identified.

When the device is on PIN entry mode, touch buttons and other touch indications that link touches on specific locations on the screen to specific actions to be taken by the device can be disabled. For example, a regular user interface during a PIN entry process could provide various actions buttons, which are buttons that will cause the device to carry out specific actions when the user touches on that specific touch coordinate, such as the numbers on an on-screen PIN pad, and buttons for additional actions such as backspace, cancel or enter. Such action buttons may not be helpful for a visually impaired user and may interfere when such user is interacting with the device, unintentionally taking the process in an undesired direction. In this way, in specific embodiments of the invention a different interface can be provided, where a visually impaired PIN holder can interact with a large portion of the display with no risk of mistakenly touching action buttons and unintentionally interfering in the overall process. This different interface may be different in that any action buttons on the screen can be disabled so that the screen is only responsive to the user gestures, such as taps or swipes, regardless of the exact position where the gesture took place on the screen.

In specific embodiments of the invention, specific action buttons may still be necessary on the display while the PIN holder is interacting. Those action buttons may be necessary for a device administrator to exit the PIN entry mode or take any other action to move the process forward. In the embodiments where such action buttons exist, they can be provided in a non-trivial pattern so that a visually impaired PIN holder does not accidentally trigger an undesired action when attempting to enter the PIN via tapping. For example, such action buttons may be activated by pressing two marked specific locations at once. As another example, an additional confirmation can be requested when a user attempts to press an action button on the screen, and the confirmation button can be located at a random and not-conventional position on the screen. This way, a visually impaired user will be prevented from taken unwanted actions when interacting with the device while the device administrator will still have on-screen options for assisting in the process. Similar functionality can be provided without the presentation of buttons on the screen such as by requiring a device administrator to enter a known special gesture or touch pattern to exit.

In specific embodiments of the invention, while a visually impaired PIN holder is interacting with the display, the content on the screen can be helpful for other purposes. For example, messages can be displayed throughout the process so that a third party, such as a device administrator, can assist the PIN holder and monitor progress. The indications for interaction described above with reference to step S202 of flow chart 200 in FIG. 2 can be projected on the screen for assistance, individually or in combination with auditory cues. Relevant instructions for a device administrator such as, for example, how to exit the PIN entry mode, can also be displayed on the screen while the PIN holder is interacting. As another example, the display can show an indication of progress for the PIN entry process, for example by incrementing a star or filling a status bar every time the PIN holder successfully enters a PIN digit. In this way, a device administrator is able to monitor the progress of the process. Alternatively or in combination, the indication of progress can be provided in a different device administrator display.

Flow chart 200 continues with step S204 of holding, after providing an indication for interaction, such as an auditory cue, for a hold period. The device then initiates, after providing the auditory cue, a hold period of a predetermined duration. The hold period can be intended for the PIN holder to take action after having received instructions though the indication for interaction. In specific embodiments of the invention, the hold period could be long enough to ensure that the PIN holder had sufficient time to interact with the device, for example, to provide the necessary number of taps for entering a PIN digit. In specific embodiments of the invention, the hold period could be short enough to ensure that the overall time for completing the process does not take longer than necessary. In specific embodiments of the invention, the hold period may be set by the PIN holder at the beginning of the operation through gestures or voice commands. Instructions for setting such hold period could be provided as part of the indication for interaction, such as the initial auditory cue. In specific embodiments of the invention, the hold period could be a preset time determined by the device manufacturer or a device administrator. For example, the hold period could be set so that an average visually impaired PIN holder is able to tap 10 times on the screen, which can be the worst-case scenario given that 9 is the biggest possible digit of a PIN and 10 taps can be used to enter "0" or other commands. In specific embodiments of the invention, the hold period can be 7 seconds. In specific embodiments of the invention, the end of the hold period can be determined by the PIN holder's inputs. For example, the device can provide options to indicate that the PIN holder has finished entering a PIN digit. In those cases, the PIN holder may be able to interact with the device by performing an action or gesture that indicates a digit was entered which defines the end of the hold period and triggers the next step on the process.

In specific embodiment of the invention, a timer can be set to keep track of the hold period. The timer can be a local timer on the device. The timer can be a hardware timer embedded in the device and controlled by the applications processor. The timer can be a software module instantiated on the applications processor or the secure processor. In specific embodiments of the invention, the hold period will be a predetermined period of time (t) fixed for all users and for all instances of the process where the PIN holder is to enter a digit of a PIN. In those embodiments, a timer can be set to start running after step S202 of flow chart 200 is completed and stop after a time (t) has elapsed. Part of the instructions provided in the indication for interaction could be dedicated to explain the time limits the PIN holder has to complete the operation. For example, an auditory cue could indicate PIN holders they have a time (t) to complete each entry.

In specific embodiments of the invention, the timer will start running only after detecting that the PIN holder has stopped tapping. In this way, the hold period could end after a time (t) of inactivity. In those embodiments, the PIN holder may be instructed to take an action other than not tapping if the PIN digit is "0" to avoid triggering the timer at the wrong time. For example, the PIN holder may be instructed to press on the screen for a longer period of time or 10 times, and the device may be programmed to detect that the PIN holder intends to enter a "0". In specific embodiments of the invention, the hold period could reset after every detected lift of the finger (or touch up). In specific embodiments of the invention, a timer can start running right after the indication for interaction is provided and be re-started every time a PIN holder interaction is detected. In those embodiments, a shorted hold period may be set. In specific embodiments of the invention, the device could measure the cadence of a PIN holder's taps and set the timer based on the PIN holder cadence. For example, a touch up and a touch down action, within a duration of time after detecting the touch up action, could be detected; and the hold period could be set based on that duration of time. In that way, the hold period could be adjusted dynamically, and made shorter if the user taps faster, and longer if the user taps slower. In specific embodiments of the invention the timer can be set for a predetermined hold period, but the hold period can be extended if taping is still happening. In specific embodiments of the invention, the device will monitor the PIN holder behavior to determine if the PIN holder has finished interacting. For example, the device could monitor the PIN holder through a camera or gesture detector to determine a period of inactivity. In embodiments in which the device includes a timer and also provides an option to indicate when a PIN holder has finished interacting, the hold period can be defined by the time set in the timer of the device or by the user indication that the PIN digit entry is complete, whichever occurs first.

Flow chart 200 includes a step S205 of receiving a user interaction. As illustrated, the user interactions can be received during the hold period. The user interaction can be taps on the touch sensor, gestures performed by the user, voice commands given by the user, or any other interaction of the user with the device. The user interactions can be performed following the indications for interaction provided in step S202.

Flow chart 200 continues with step S206 of processing the PIN holder interactions that occurred during the hold period, received in step S205. Although these steps are shown as occurring sequentially, the processing can also commence during the hold period and/or while the user interaction is being received in step S205. This processing can include determining a number of taps provided on a touch sensor, such as touch sensor 155 on display 130 in the device 100 of FIGS. 1A and 1B. The device can be configured to determine the number of taps by counting touches (touch down) on the screen that are followed by a release (touch up) occurring in a predetermined period of time after the touch.

For the purposes of this disclosure, a touch event is produced when a touch down action is followed up with a touch up action. The length of time between the touch down action and touch up action determines whether a touch is considered a tap or a long press. The threshold may be adjusted depending on the system, or at the discretion of the device manufacturer or device administrator. In specific embodiments of the invention, the default threshold can be 1 second. If the touch down action is followed by a touch up action within that threshold then it can be considered a tap, otherwise the event can be considered a long press. Subject to this differentiation between a tap and a long press, the change in touch coordinates between the touch down action and up action determines whether a touch is considered a tap or a swipe action. If the touch coordinates on the touch sensor do not change significantly during the predetermined period of time, then the action can be considered a tap. If the touch coordinates on the touch sensor change during the predetermined period of time, then the action can be considered a swipe. A significant change in touch sensor coordinates could be less than that associated with detecting a swipe gesture but more than a heuristic hysteresis associated with detecting a double tap on a single location.

The device can alternatively be configured to determine the number of taps by counting touches or presses regardless of whether they are followed by a release or not. This approach can be advantageous because it allows the PIN holder to rest the finger or hand on the screen after a tap, for example between PIN digits entries, while still counting all the interactions, including the final touch and rest, as a tap. In embodiments in which touches (touch down) are counted instead of taps (touch down followed by touch up), the action of continuously pressing a point on the screen can advantageously not be mapped to any other command such as erase or cancel. However, the action of a hold following a touch could still be mapped to a digit entry confirmation command.

The processing can also include determining if a different action was received from the user, such as a gesture on the screen other than tapping or a voice command. If an action other than tapping was detected, and the device has mapped that action to a command as explained before in this disclosure, the device can execute the command associated with the action, in step S214. For example, a swipe up may have been detected in step S206. The device may be configured to map a "swipe up" action to a "delete" command, and a digit of the PIN will be deleted accordingly in step S214. In this example, a PIN holder may have been indicated, through the indication for interaction, to swipe up to delete the last digit entered. The action "swipe up" associated to a command to delete a digit was provided for explanatory purposes only. Any kind of user action or gesture can be mapped to any kind of commands to be executed by the device, at the discretion of the device manufacturer or device administrator. When an unknown action is entered, such as a gesture that is not mapped to any specific command, an error massage can be provided. For example, an auditory cue may be provided indicating that the action was not recognized by the device and asking the PIN holder to try again. In this case, the process can go back to step S202 or the hold period can be re-started, so that the user has a second chance to provide the correct gesture or action. In specific embodiments of the invention, the device may be configured to disregard the first interaction of the user with the touch surface. The user may be allowed to touch the screen or other touch surface before beginning to enter the PIN in order to locate the surface to be touched. In those cases, the device may be configured to ignore those location touches and start the process once the user is familiar with the position of the touch surface. Specific instructions can be provided in that regard. Users may be instructed at the beginning of the process to identify a screen in front of them. Once the user has located the screen, the PIN entry process can begin. The screen or other touch surface could be big enough and be located in a convenient position so as to facilitate a visually impaired PIN holder to interact with it. In specific embodiment of the invention, the device administrator will indicate the position of the screen or touch surface, for example, by placing the user finger directly on the surface, or by placing the surface where the PIN holder can easily reach it.

When it is determined, in the processing step S206, a number of taps provided by the PIN holder, the next step S208 of storing the number of taps takes place. The secure processor may be programmed to receive information on the number of taps from the touch controller and translate such information into a representation of a digit of the PIN entered by the PIN holder. The number of taps can be stored as a digit in a sequence. The number of taps can be stored in the secure memory of the secure processor. The number of taps can be stored in a buffer of the secure processor. In specific embodiments of the invention, the number of taps can be stored in a trust zone of a memory of the applications processor. In any case, since the number of taps ultimately represent the digits of a PIN, it is desirable that the associated information is stored securely.

In specific embodiments of the invention, the total number (n) of digits of a PIN is known prior to the execution of the method. In those cases, steps S202, S204, S205, S206, S208, and S214 can be repeated in a cycle as necessary until the sequence of digits created in step S208 has reached the same number of digits (n), which means the PIN entry was completed. When the sequence has reached n digits, the method can end in step S212 of finishing the process. In this last step, an auditory cue can also be provided to the PIN holder indicating the PIN entry process is complete. Additionally or in combination, the auditory cue could inform the user if the PIN entry was successful or if the PIN is incorrect. In such case, the user may be provided with the option of starting the process over from step S202, or any other option such as cancelling or exiting the PIN entry mode. The user may be able to select among those options though gestures or other action as disclosed before in this disclosure.

In embodiments of the invention in which the number of PIN digits (n) is not known or is not fixed, the method can repeat in a loop or cycle from step S208 to step S202 directly until an indication from the user to cancel or finish is provided. For example, an specific PIN holder's sequence complete input, such as an specific gesture or voice commands, could be mapped to the "finish command", and thus the device will only finish the process after receiving such sequence complete input from the user. Alternatively, the device could provide auditory cues asking the user if the PIN has more digits and repeat the steps of the method when the user answer is a positive.

When the PIN holder interacts with the device and the number of taps for one digit of the PIN is stored in step S208, the process can start all over until the PIN entry is complete, which means the PIN holder has entered all the digits of the PIN. Every time the method re-starts the PIN holder can be provided with new indications for interaction. For example, the PIN holder may be given instruction on how to delete the last digit entered. Alternatively, or in combination, the same instructions provided at the beginning of the process when entering the first digit can be repeated. In specific embodiments of the invention, the PIN holder can be provided with all the necessary instructions at the beginning of the first interaction with the device and breaks between PIN digits entries are indicated by other signs, such as an indicative sound. In those embodiments, no other instructions are given during the process unless specifically requested by the PIN holder. In specific embodiments of the invention where no instructions are given in the middle of the process unless specifically requested by the user, breaks between each PIN digit can be established by the PIN holder, for example by long presses or pauses between series of taps.

Figure 3:
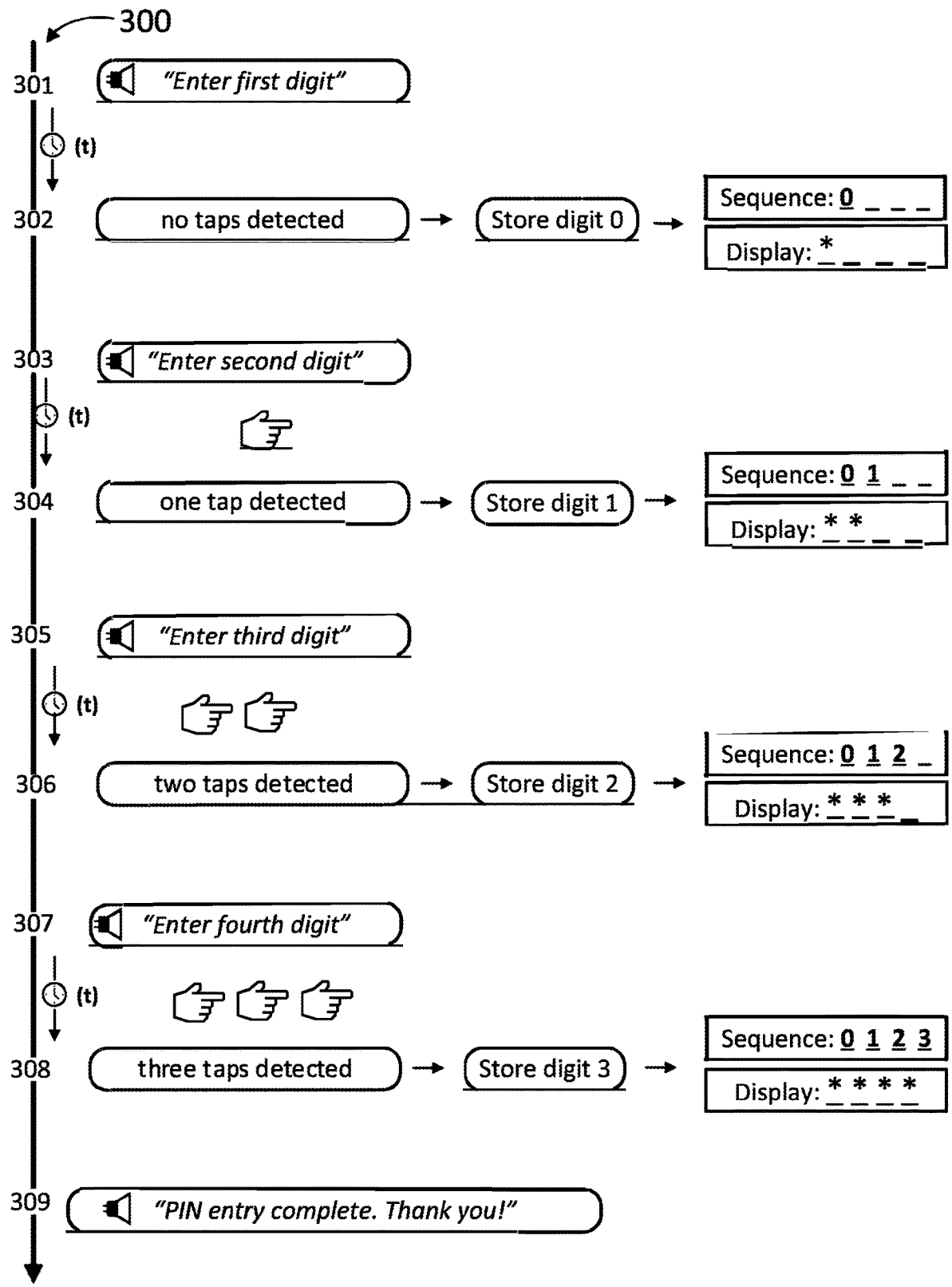
FIG. 3 illustrates an example of a PIN entry procedure in accordance with specific embodiments of the invention disclosed herein.

The experience of entering a "0123" PIN in accordance with the method described in flow chart 200 of FIG. 2 will be described with reference to FIG. 3. FIG. 3 illustrates an example of a basic PIN entry procedure along process arrow 300. In line 301 an auditory cue is provided. The auditory cue is shown as a simple "Enter First digit" message for illustrative purposes only. An auditory cue providing all the necessary instructions to interact with the device may be provided at this stage. The auditory cue can instruct the PIN holder about the requirements for tapping to enter the PIN digit and all the possible gestures to trigger commands such as delete, cancel, or finish. The applications processor, such as applications processor 120 of FIGS. 1A and 1B, can be responsible for providing the auditory cue or any kind of indication for interaction.

After a hold period (t), the number of taps provided by the PIN holder is determined in line 302. In this specific example, the first digit of the PIN to be entered is "0", and the user may have been instructed not to tap to enter such digit. Since no tap was determined, a corresponding digit "0" can be stored in a sequence. At the same time, an indication of progress can be shown in a display, such as a star for a digit successfully entered. The secure processor, such as secure processor 110 of FIGS. 1A and 1B, can be responsible for setting the hold period and determining and storing the number of taps. The secure processor can update the applications processor periodically so that the applications processor can provide the progress indication on the screen or any other indication necessary to continue with the process.

A new auditory cue is provided in line 303. The auditory cue is shown as a simple "Enter Second digit" message for illustrative purposes only. An auditory cue providing all the necessary instructions to interact with the device may be provided at this stage. Alternatively, a simple click or chime can be played at this stage to confirm entry of the first digit. After a hold period (t), the number of taps provided by the PIN holder is determined in line 304. In this case, one tap was necessary, because the second digit of the PIN to be entered is "1". Since one tap was determined, a corresponding digit "1" can be stored in the sequence, which now comprises digits "0" and "1". At the same time, an indication of progress can be shown in a display, such as a second star for the second digit successfully entered.

A new auditory cue is provided in line 305. The auditory cue is shown as a simple "Enter Third digit" message for illustrative purposes only. An auditory cue providing all the necessary instructions to interact with the device may be provided at this stage. Alternatively, a simple click or chime can be played at this stage to confirm entry of the second digit. After a hold period (t), the number of taps provided by the PIN holder is determined in line 306. In this case, two taps were necessary, because the third digit of the PIN to be entered is "2". Since two taps were determined, a corresponding digit "2" can be stored in the sequence, that now comprises digits "0", "1" and "2". At the same time, an indication of progress can be shown in a display, such as a third star for the third digit successfully entered.

A new auditory cue is provided in line 307. The auditory cue is shown as a simple "Enter Fourth digit" message for illustrative purposes only. An auditory cue providing all the necessary instructions to interact with the device may be provided at this stage. Alternatively, a simple click or chime can be played at this stage to confirm entry of the third digit. After a hold period (t), the number of taps provided by the PIN holder is determined in line 308. In this case, three taps were necessary, because the fourth digit of the PIN to be entered is "3". Since three taps were determined, a corresponding digit "3" can be stored in the sequence, that now comprises digits "0", "1", "2" and "3". At the same time, an indication of progress can be shown in a display, such as a fourth star for the fourth digit successfully entered.

A new auditory cue is provided in line 309 to finish the process. This auditory cue is optional and may only be intended to provide a user-friendly experience to the PIN holder. Additionally, this last auditory cue may inform the user about the result of the PIN process entry, for example, whether the PIN was entered correctly or incorrectly.

In the example of FIG. 3, the hold period was set as a predetermined time (t) running from after the auditory cue to before the determination of the PIN holder's taps. As explained before, the hold period may be set differently for each user or for each specific digit entered or instance of the process. However, this approach is particularly relevant because by providing a fixed time for entering each number other people not involved in the process are not able to listen in and determine which how many times the user tapped, because the same waiting time will be necessary for 1 tap than for 9 successive taps.

In specific embodiments of the invention, the auditory cue provided in line 301 will be comprehensive, and detailed intermediary auditory cues provided in lines 303, 305 and 307 will not be provided unless specifically requested by the user. The first auditory cue can also be provided in response to an initial touch input from the user and include a confirmation that they have contacted the correct surface. Although the example of an auditory cue is used in the examples given in this disclosures, other types of cues can be given throughout the process, such as visual or haptic cues. In specific embodiments of the invention, the device includes one or more actuators to provide such cues. For example, the device can include a motor or vibrator to produce a vibration or movement as an indication for the user.

Figure 4:
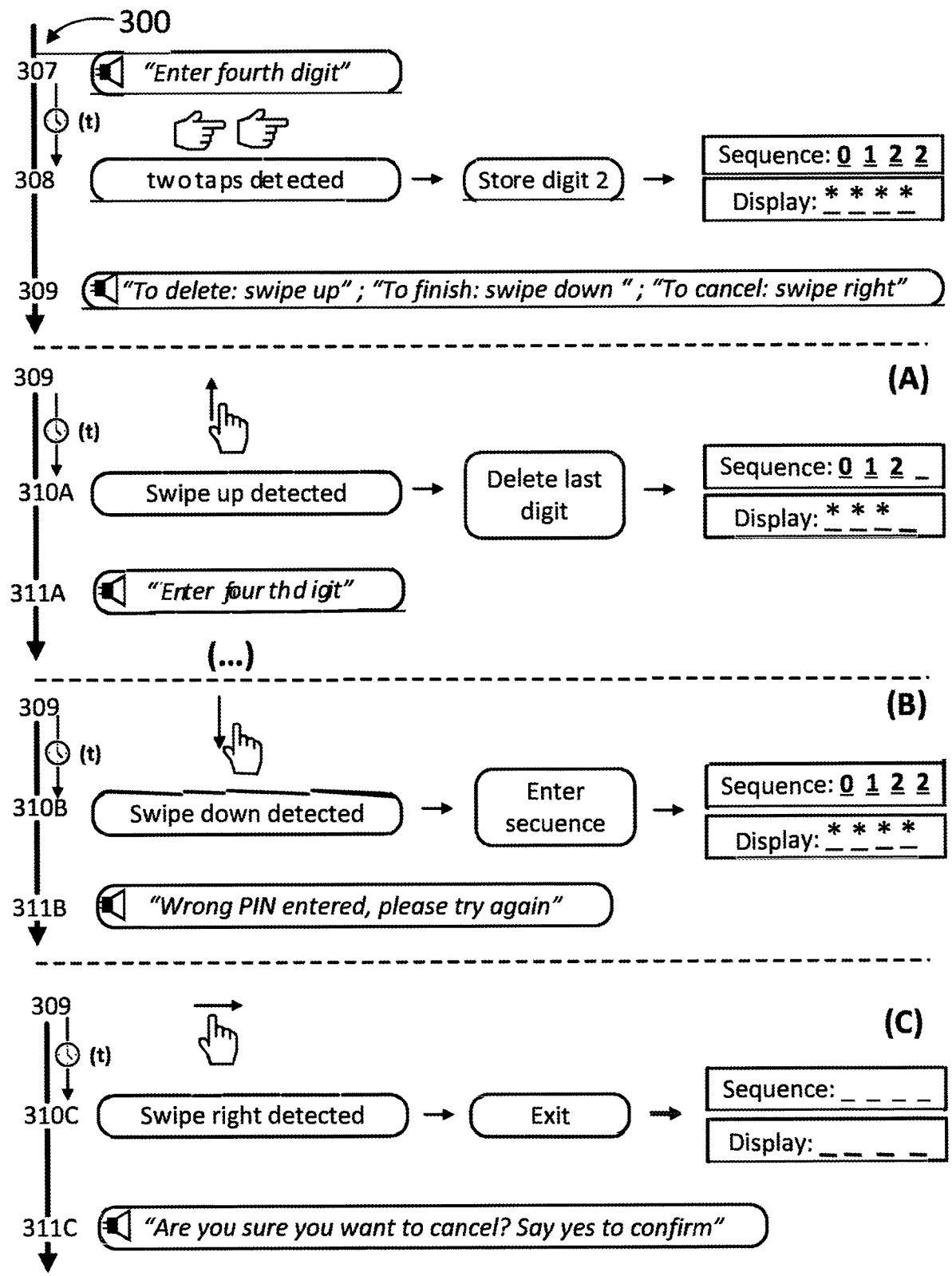
FIG. 4 illustrates an example of a PIN entry procedure including additional interaction between the user and the device in accordance with specific embodiments of the invention disclosed herein.

FIG. 4 illustrates examples of the same PIN entry procedure illustrated with reference to FIG. 3 along process arrow 300, including additional interaction between the user and the device. FIG. 4 provides exemplary alternatives (A), (B) and (C) that can be provided to the PIN holder in any instance of the process in accordance with specific embodiments of the present invention. For explicative purposes, line 307 of process arrow 300 will be used as a reference point on the process. At this point, the user has already entered the three first digits of the PIN as explained with reference to FIG. 3, and the stored sequence and display status are as shown in line 306 of FIG. 3. It is known from the previous example that the correct PIN digit to be entered in the next instance of the process would be "3".

In the example of FIG. 4, an auditory cue is provided in line 307, as explained with reference to line 307 of FIG. 3. The auditory cue is shown as a simple "Enter Third digit" message for illustrative purposes only. An auditory cue providing all the necessary instructions to interact with the device may be provided at this stage. After a hold period (t), the number of taps provided by the PIN holder is determined in line 308, as explained for line 308 of FIG. 3. In this case, two taps were provided, although the correct third digit of the PIN to be entered is "3". Since two taps were determined, a corresponding digit "2" can be stored in the sequence, that now comprises digits "0", "1" "2" and "2". At the same time, an indication of progress can be shown in a display, such as a third star for the third digit successfully entered.

In line 309, an auditory cue is provided. This auditory cue can be the same auditory cue provided in lines 301, 303, 305 and 309 of FIG. 3. As shown in line 309, the auditory cue can provide instructions for the PIN holder to take certain actions if desired. The auditory cue is provided as a simple "To delete: swipe up"; "To finish: swipe down"; "To cancel: swipe right" message for illustrative purposes only. An auditory cue providing all the necessary instructions to interact with the device may be provided at this stage. Additionally, the association of the actions swipe up, down or right with the commands to delete, finish and cancel was provided for illustrative proposes only. As explained above, user actions or gestures can be mapped to commands for the device in numerous different ways.

In the example (A) of FIG. 4, after a hold period (t) measured from line 309, a swipe up is detected in line 310A. This can mean that the PIN holder realized that the incorrect PIN digit was entered and wishes to delete it in accordance with the instructions provided in the auditory cue. Since a swipe up was determined, and such action is mapped to a "delete" command in this example, the last digit "2" can be removed from the sequence, that now comprises digits "0", "1" and "2". At the same time, an indication of progress can be shown in a display, such as removing the fourth star for the fourth digit previously entered. The process can continue with line 311A of providing a new auditory cue for entering the fourth digit.

In the example (B) of FIG. 4, after a hold period (t) measured from line 309, a swipe down is detected in line 310B. This can mean that the PIN holder did not realize that the incorrect PIN digit was entered and wishes to indicate that the PIN entry is complete and submit the sequence for processing in accordance with the instructions provided in the auditory cue. Since a swipe down was determined, and such action is mapped to a "finish" command in this example, the PIN sequence as stored in memory can be submitted to a PIN processing module for verification. In this case, since the user entered a wrong digit, an auditory cue can be provided to the user in line 311B indicating that the PIN entry failed. This auditory cue could also provide instructions for re-starting the process or other instructions.

In the example (C) of FIG. 4, after a hold period (t) measured from line 309, a swipe right is detected in line 310C. This can mean that the PIN holder realized that the incorrect PIN digit was entered and wishes to cancel the process in accordance with the instructions provided in the auditory cue. Since a swipe right was determined, and such action is mapped to a "cancel" command in this example, the PIN entry mode can be aborted, the PIN sequence in memory can be cleared and all indications of progress in the display can be removed. In this and all cases, a confirmation auditory cue can be provided so that the PIN holder can confirm the commands intended to be entered. Confirmation can be provided via gestures or voice commands, such as saying "yes" or "no", as shown in line 311C.

From the examples explained with reference to FIG. 3 and FIG. 4 above, the use of a tally PIN entry mode of the present invention can be understood. A user can tap the screen multiple times corresponding to numbers (0-9) for each digit of the PIN, and/or perform other gestures/actions to interact with the device. For every digit of the PIN, the customer can be instructed to tap multiple times on a screen associated with the number (e.g. once for "1", twice for "2", thrice for "3" . . . . None or ten times for "0", etc.). The user can repeat this process for the next digits of the PIN. At any time, the user could perform other actions such as long-press to clear an entry and start over, or request assistance from the device administrator to start over or insert a different card, without revealing their PIN.

In specific embodiment of the invention, the device can offer different experiences to its users depending on various factors. For example, the device could provide a visual experience (for sighted and low vision users without speakers/headphones or auditory cues). In this case, the user can receive indications for example via a display, to enter their PIN. These embodiments can include the use of a standard PIN pad for entering a PIN, either on screen or as a physical device. The user can interact with the device such as by pressing "enter" to complete the process. The device could provide various feedbacks or just present the next screen for the process. The user may be provided with options to take actions such as skip, cancel, clear, etc. A feedback can be provided as indication of progress such as an asterisk on the screen.

As another example, the device could provide an on-screen experience including auditory cues, for example when speakers or headphones are connected. In those embodiments, the user can receive an indication to enter the PIN and to listen for instructions. The user can complete the process by following the instructions and a feedback can be provided as indication of progress such as an asterisk on the screen. In those embodiments, the different resources, such as the different means for outputting/inputting information, can be used to guide the user throughout the process.

As another example, the device could provide an audio experience (for low vision and blind users using auditory cues, for example via speaker or headphones). In those embodiments, the whole process can be performed by giving auditory cues to the user. For example, the user could be guided by a process as described in the examples of FIGS. 3 and 4. Other auditory cues can be provided so that the process can be carried out. A non-limiting list of examples of auditory cues and associated user actions includes: "Next, you'll enter your PIN by tapping it on the screen"; "For the number one, tap once. For two, tap twice, and so on. For zero, tap ten times."; "Listen for a prompt to enter each digit"; "To clear your PIN and start over, long press, or hold your finger down until you hear a [tone 2]"; "For your security, your PIN will not be visible on the screen"; "Please tap your first digit". The user can then tap a certain number of times and pause. "Please tap your second digit." The user can tap a certain number of times and pause. "Please tap your third digit." The user can tap a certain number of times and pause. "Please tap your fourth digit." The user can tap a certain number of times and pause. "If your PIN is longer than four digits, please double tap now." (or in a yes/no embodiment, "tap once for no, double tap for yes", for example). The user can tap a certain number of times and pause, for example a double tap, indicating a "yes" in this example. "Please tap your fifth digit." The user can tap a certain number of times and pause. "If your PIN is longer than five digits, please double tap now." The user can tap a certain number of times and pause.

Other cues can also be provided such as indication about a possible wrong digit entered. For example, if the number of taps is fewer than 1 or more 10, a cue could be "You entered an invalid digit. Please tap your (third) digit again." Additionally, when the PIN is complete, a feedback can also be provided to indicate that the task is complete, for example "Processing . . . Your PIN was accepted" or "Processing . . . Invalid PIN. Please try again". Then the process can continue with announcing the first header of the next screen. As explained before, the device could also provide instructions for other actions, for example "To clear your PIN and start over, long press, or hold your finger down until you hear a [tone 2]." In specific embodiments of the invention, two or three finger swipes to the left/right/up/down can be used as additional gestures.

Figure 5:
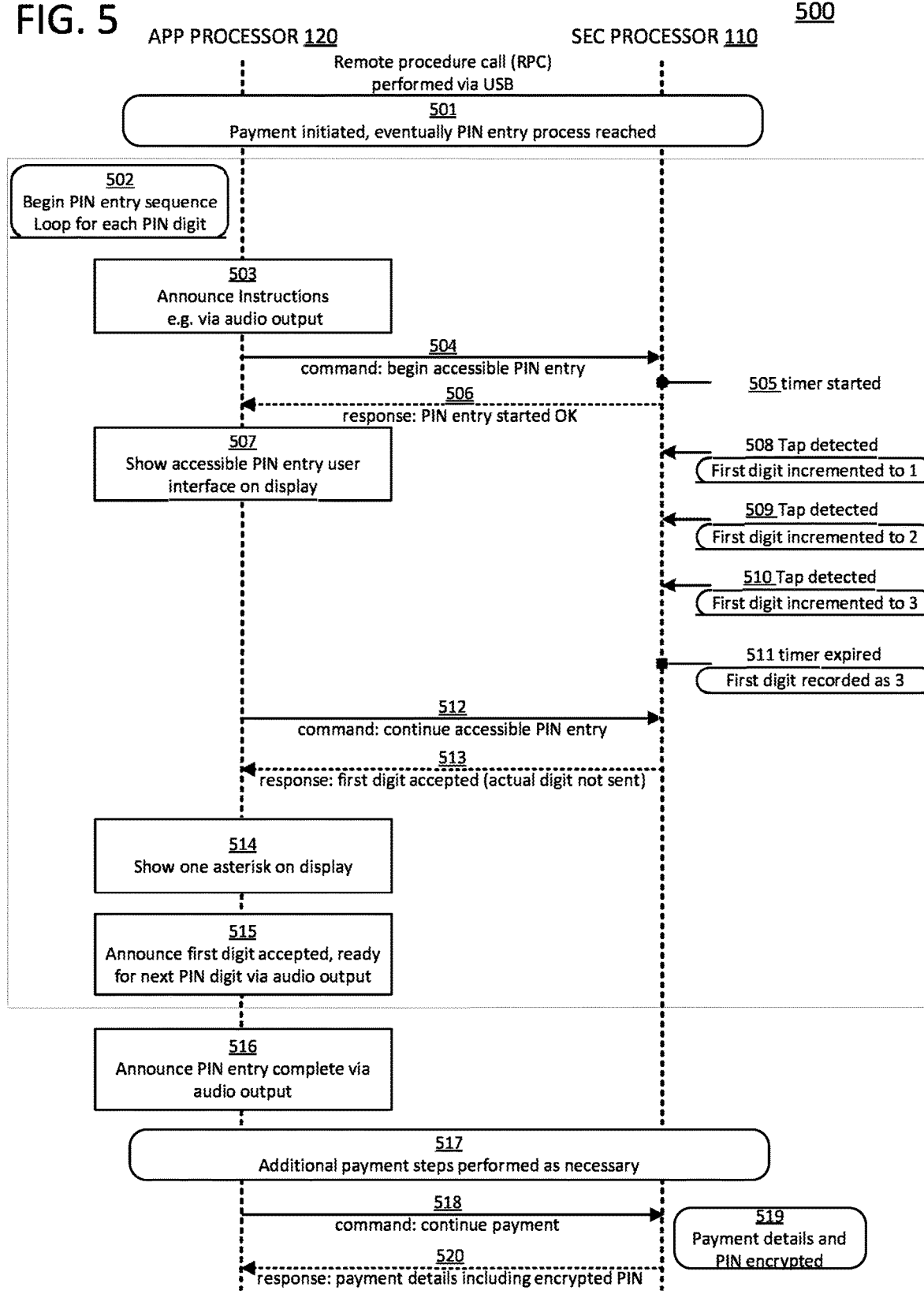
FIG. 5 illustrates an example of a sequence diagram between an applications processor and a secure processor for a PIN entry process in accordance with specific embodiments of the invention disclosed herein.

FIG. 5 includes an example of a sequence diagram 500 between an applications processor and a secure processor for a PIN entry process in accordance with specific embodiments of the invention. The steps in the diagram are examples of how the processes described above can be carried out. As illustrated, the applications processor, such as applications processor 120 of FIGS. 1A and 1B, can communicate with the secure processor, such as secure processor 110 of FIGS. 1A and 1B, via RPCs performed via USB. As explained before in this disclosure, this is not a limitation of the present invention. The processors can communicate in various ways and using any available technology.

Diagram 500 illustrates an example of a payment process, where a PIN entry process is eventually needed. Processing steps are represented with rounded edges while action steps are represented with sharp edges. The beginning of the process is illustrated in step 501, which can include any initial processing before the PIN entry takes place. At step 502, the PIN entry process begins. The greyed box includes the sub steps that can be part of a loop for a very digit of the PIN to be entered. First, in step 503, instructions are announced, for example via auditory cues as explained before. The applications processor 120, pr an application running on it, can sends a command to the secure processor to "begin accessible PIN entry" in step 504. This can be an accessibility sequence entry commencement command sent from a secure application on the applications processor. The secure processor can initiate a timer in step 505. This timer can set the hold period described before in this disclosure. The secure processor 110 can additionally send a response "PIN entry started" in step 506.

After the secure microcontroller receives the accessibility sequence entry commencement command, all data from the touch sensor can be routed directly to the secure microcontroller. The accessible PIN entry user interface can be presented on the display as indicated in step 507, and the process for entering the PIN digits can be performed. As indicated in steps 508, 509, and 510, as taps are being detected the secure microcontroller can increment a digit being entered. The secure processor can perform these actions by incrementing a counter. In step 511 the timer expires. Since three taps were detected, and the digit was incremented to 3, the first digit can be recorded as 3. In this way, the secure processor stores the value for the digit in a sequence.

In step 512, the applications processor indicate that the PIN entry process continues by sending a command to the secure processor. The secure processor could transmit a value accepted signal to the applications processor after determining the number of taps, as illustrated in step 513 "first digit accepted". A digit received symbol can be generated for a display of the device using the applications processor after receiving the value accepted signal on the applications processor. The digit received symbol can be the indication of progress described before in this disclosure, such as an asterisk as indicated in step 514. An auditory (or other) cue can be provided after receiving the value accepted signal on the applications processor. The sue can indicate that the device is ready for receiving the next PIN digit, as illustrated in step 515. This loop can be repeated until the device is no longer in PIN entry mode. When all the PIN digits are entered, an auditory cue can be provided announcing that the PIN entry is complete, as indicated in step 516.

Other steps related to the PIN processing process or to a payment processing can be performed as necessary as indicated in step 517. For example, the applications processor could send a command to the secure processor in a step 518 to continue payment. The secure processor can encrypt payment details and the PIN entry in step 519 for transmission to the applications processor in a step 520. In this way, the sequence of digits recorded in steps 508-511 can be encrypted and securely transmitted outside the secure processor.

Referring back to the components described with reference to FIGS. 1A and 1B, it has been shown through this disclosure the interrelation between each component of the device and the steps for completing a PIN entry process. The PIN entry process can be administrated by firmware on a secure processor, such as secure processor 110. For example, the instructions of the process can be permanently stored on a secure memory, such as secure memory 115, on the secure processor. The secure processor can be in operative communication with an applications processor, such as applications processor 120, and the applications processor may also have access to stored instructions to carry out the steps of the process. The instructions can be encoded using any general purposes computer program language, such as C.

The language used can depend on where the code will be running. Code running on the application processor can be written in a language that can be compiled into JVM bytecode (Java class files), which can then be further transformed into a form that can processed by an interpreter of JIT engine supported by the operating system, such as the Dalvik VM or ART (Android Runtime). Specific embodiments of the invention use Java and Kotlin. In specific embodiments of the invention, the applications processor supports running code that has been compiled natively for the particular target CPU architecture, for example it could run C++ or Rust compiled into a native ARM64 binary. In specific embodiments of the invention, the secure processor runs native code only (no interpreter or JIT engine). In specific embodiments of the invention, all relevant code for the secure processor can be written in pure C. In specific embodiments of the invention, other languages could be used to write code for the secure processor such as C++ or Rust. In specific embodiments of the invention, the code can only be run on the processor for which it was specifically intended, either the application processor or the secure processor.

An example of a pseudo code for the applications processor is presented below.

```
bool doTallyTapPinEntry( ){
    displayTallTapPinEntryScreen( );
    audioPlayAnnouncementForEvent(EVENT_TALLY_TAP_START);
    Message outMessage = new Message( ).setCommand(CMD_START_TALLY_TAP);
    Message inMessage = sendMessageToSP(outMessage);
    bool entrySuccess = false;
    while (true) {
  if (!inMessage.containsEvent(EVENT_TALLY_TAP_CONTINUE)) {
    break;
  }
  outMessage = new Message( ).setCommand(CMD_CONTINUE_TALLY_TAP);
  in Message = sendMessageToSpAndWaitForResponse (outMessage);
  if (inMessage.containsEvent(EVENT_PIN_DIGIT_RECORDED)) {
    audioPlayClickSound( );
    displayAddAsterisk( );
    audioPlayAnnouncementForEvent(EVENT_PIN_DIGIT_RECORDED);
  }
  if (inMessage.containsEvent(EVENT_ERROR_TOO_MANY_TAPS)) {
    displayMessageForEvent(EVENT_ERROR_TOO_MANY_TAPS);
    audioPlayAnnouncementForEvent(EVENT_ERROR_TOO_MANY_TAPS);
  }
```

```
}
if (inMessage.containsEvent(EVENT_PIN_ENTRY_COMPLETE)) {
    audioPlayAnnouncementForEvent(EVENT_PIN_ENTRY_COMPLETE);
    entrySuccess = true;
}
//Tally tap PIN entry is now complete, if a PIN was obtained by the secure
// processor then entrySuccess is true
return entrySuccess;
}
```

An example of a pseudo code for the secure processor is presented below

```
/**
 * Waits for a complete touch event, a complete touch event is composed of at least two
 * actions,beginning with a touch down action and ending with a touch up action.
 * If no touch event occurs within the given time parameter then the method returns with
 * an empty event.
 */
TouchEvent waitForTouchEvent(int millisToWait);
/**
 * Start tracking the beginning of a tally tap digit entry, it lasts as long as the given
 * number of milliseconds.
 */
void startTallyTapDigitTimer(int millis);
/**
 * Switch the touch controller mux to either AP or SP. Touch data will flow only to the
 * selected processor.
 */
void setTouchMux(TouchMuxSetting tms);
// Store the current PIN
int[ ] pinDigits = new int[4];
// Stores the number of PIN digits that have been entered so far
int currentDigitPosition = 0;
// Stores the value of the digit currently being entered
int currentDigitValue = 0;
//Stores the current input mode which controls how input is handled
InputMode inputMode = INPUT_MODE_NONE;
    InputMode getInputMode( ) {
        return inputMode;
    }
    void setInputMode(InputMode mode) {
        switch (mode) {
            case INPUT- MODE- NONE:
                setTouchMux(TOUCH_MUX_AP);
                break;
            case INPUT MODE- TALLY- TAP:
                setTouchMux(TOUCH_MUX_SP);
                break;
        }
    }
    void handleTallyTapTouch(TouchEvent e) {
    if (isTallyTapDigitTimerExpired( )) {
        //ten taps counts as a zero digit (optional feature)
        if (currentDigitValue == 10) {
            currentDigitValue = O;
        }
        if (currentDigitValue > 10) {
            // too many taps, user error, cancel the process
            setInputMode(INPUT_MODE_NONE);
            pushMessage(new Message( ).addEvent(EVENT_ERROR_TOO_MANY_
TAPS));
        } else {
        // Record the digit internally
        pinDigits[currentDigitPosition] = currentDigitValue;
        currentDigitPosition++;
        currentDigitValue = o;
    }
    if (currentDigitPosition == 4) {
        // PIN entry is now complete
        setInputMode(INPUT_MODE_NONE);
        pushMessage(new Message( ).addEvent(EVENT_PIN_ENTRY_COMPLETE));
    } else {
        // Reset the timer for the next PIN digit
        startTallyTapDigitTimer(7000);
        pushMessage(new Message( ).addEvent(EVENT_PIN_DIGIT_RECORDED));
```

```
        pushMessage(new Message( ).addEvent(EVENT_TALLY_TAP_CONTINUE));
      }
    } else {
      if (isTallyTapTouch(e)) {
        currentDigitValue++;
        pushMessage(new Message( ).addEvent(EVENT_TALLY_TAP_CONTINUE));
      } else if (isCancelTouch(e)) {
        setInputMode(INPUT_MODE_NONE);
        pushMessage(new Message( ).addEvent(EVENT_CANCEL_PIN_ENTRY));
      }
    }
  }
}
    // Started by the operating system in it's own thread
    void rpcThread( ) {
      while (true) {
        // Wait until a message from Application Processor arrives
        Message in Message= waitForMessageFromAp( );
        Message outMessage = new Message( );
        switch (inMessage.getCommand( )) {
          case CMD- START- TALLY- TAP:
            if (getInputMode( ) == INPUT_MODE_NONE) {
              setInputMode(INPUT_MODE_TALLY_TAP);
              startTallyTapDigitTimer(7000);
              pushMessage(new Message( ).addEvent(EVENT_TALLY_TAP_CONTINUE));
            }
            break;
        }
        if (getInputMode( ) == INPUT_MODE_TALLY_TAP) {
          TouchEvent e = waitForTouchEvent(100);
          handleTallyTapTouch(e);
        }
        // Receive all internal messages from the message stack and collect into a single out message
        Message m;
        while ((m = popMessage( )) != null) {
          outMessage.addEventsFromMessage(m);
        }
        sendMessageBackToAp(outMessage);
      }
    }
```

In specific embodiments of the invention, the secure processor will be responsible for collecting all sensitive touch data as provided, for example, by touch controller 140. The secure processor can update the applications processor periodically so that the applications processor can control the different means for outputting or inputting information accordingly, such as speaker 125, microphone 135 and display 130. For example, the secure processor may notify the applications processor when the secure processor is ready to start a PIN entry procedure. The applications processor can then control the means for outputting information to issue the initial instructions for the user, such as the indications for interaction in the form of an auditory cue or a display message. The applications processor can also be notified when a new PIN digit has been entered or deleted, and then control the display so that an indication of progress displayed is updated.

The secure processor (also referred to as secure board or secure microcontroller) can be a chip in the device that is separate from the applications processor. The applications processor can be a main applications processor running an operating system for the device, such as Android. The secure processor can handle sensitive information in an isolated environment to mitigate hardware and software attacks which might compromise sensitive data, such as card data or customer PIN in the case of devices that are use to process payment information. The primary reason a separate chip may be required is to pass Payment Card Industry (PCI) PIN Transaction Security (PTS) Point of Interaction (POI) device requirements. This is a security standard that payment devices which optionally accept PINs and process sensitive cardholder account data must adhere to.

Communication between the secure processor and the application processor can occur in various ways. For example, communication between an operating system (such as Android), or the applications processor running such operating system, and the secure processor may occur via remote procedure calls (RPCs). As another example, communication between an operating system (such as Android), or the applications processor running such operating system, and the secure processor may occur via asynchronous signals. RPCs can provide the bulk of the functionality and can be served, for example, over USB. The operating system, or the applications processor running such operating system, can be the USB host and the secure processor can be a USB device providing a bulk in and bulk out interface. The operating system can "wake up" the secure processor if it is "sleeping" using a signal. The operating system can invoke a USB bulk out method to send the RPC command and associated parameter data. It can invoke the USB bulk in method and block until the secure processor responds to the RPC with response data. In specific embodiments of the invention, only one RPC may be invoked at a time. Signals can be implemented via GPIOs to provide a mechanism to send notifications between the two processors. Specific embodiments of the invention provide a STOP signal to notify the secure processor to stop what it is doing in certain situations. Specific embodiments of the invention provide a NFC signal, for example for Mini/Mobile, to signal that the operating system should play a NFC tap success tone. This can be necessary due to strict performance requirements imposed on contactless payments, that the secure micro can emit the beep itself. Specific embodiments of the invention provide a secure micro event signal that can be used to notify the operating system that something interesting/relevant just happened on the secure processor, such as a card insert or swipe or chip card inserted.

The operating system can serve as gatekeeper to the secure processor by managing communication to the secure processor. For example, a privileged application included in the Android platform can serve as gatekeeper to the secure processor by supplying a ContentProvider that can manage all communication to the secure processor. In specific embodiments of the invention, the ContentProvider implemented is fulfilled by the SecureBoardConnectionProvider. Proprietary applications of the device manufacturer can use the provider through call methods, for example in an RPC model. The SecureBoardConnectionProvider can provide an interface to open and close a session with secure processor, which can ensure that multi-step RPC operations such as taking a payment are not interrupted by other operations such as updating a real time clock or injecting keys.

In specific embodiments of the invention, once a session has been obtained a token can be returned and the UID of the caller can be recorded. From then on only the caller holding the token may invoke an RPC until the session is closed. There can be time limits on RPCs and sessions. Attempts to open a session when an existing session is already open can block in a fair queue for a given amount time until the session is available or time out. Specific embodiments of the invention involve devices including more than one secure processor. On devices where there are multiple secure processors, when a session is opened all secure processors can be reserved for the session owner. In this situation the RPC call can include the intended secure processor and RPCs can be invoked on secure processors simultaneously if desired.

Figure 6:
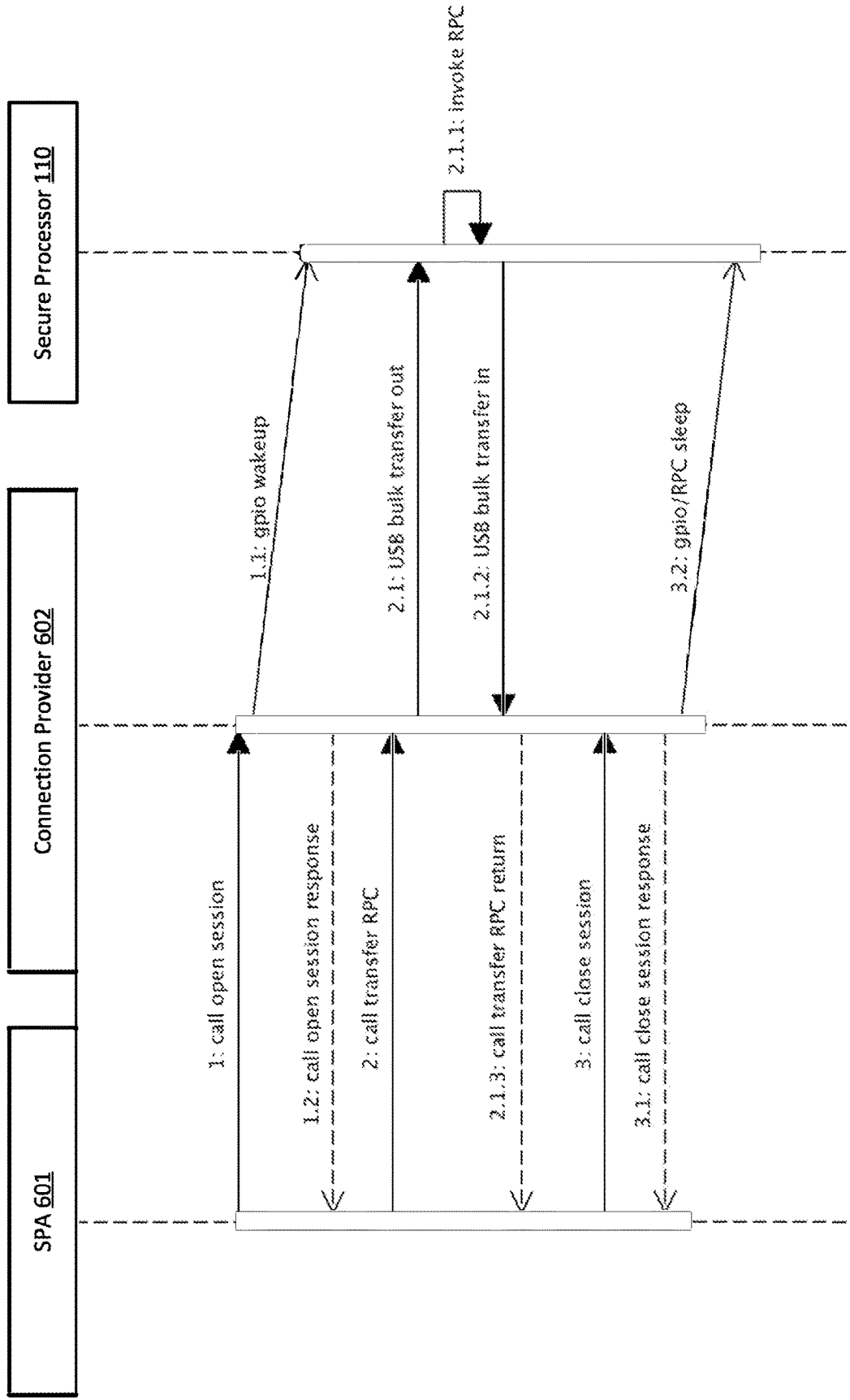
FIG. 6 illustrates an example sequence diagram of communication between a secure payment application (SPA), a content provider and a secure processor in accordance with specific embodiments of the invention disclosed herein.

In specific embodiments of the invention, a secure payment app (SPA) can be one of the users of the secure processor. FIG. 6 includes an example sequence diagram 600 of communication between an SPA 601, a content provider 602 and a secure processor, such as secure processor 110, in accordance with the process describe above. In the diagram 600, the exchange of calls to open and close session, wake up and sleep secure processor, bulk in and bulk out transfers, etc., are provided as exemplary ways in which an SPA and secure processor can initiate a session and exchange information. However, numerous alternatives are possible. As illustrated, the SPA 601 can send a call open session function call to the content provider 602 which can then send a GPIO wakeup signal to the secure processor 110. This signal could be received via a GPIO connection between the secure processor and the applications processor. The content provider can then send a response to the call open session function call to the secure application. The SPA 601 can then send a call transfer RPC to the content provider 602 which can, in turn, initiate a USB bulk transfer of data out to the secure processor using another function call to the content provider 602. The USB bulk transfer of data out can pass the secure processor all the information needed to conduct the session (e.g., the amount being charged in the transaction that the SPA is processing, a transaction identifier for the transaction, etc.). To complete the session, the secure processor 110 can invoke a remote procedure call which leads to a USB bulk transfer of data in. The USB bulk transfer in or data can involve the secure processor transferring the data required for the process to continue (e.g., encrypted payment information, a transaction authorization confirmation, etc.). The content provider can utilize other means for passing the information back and forth with the secure processor. Regardless, the content provider 602 serves to return the information requested by the initial transfer RPC. As such, the process can then continue with the content provider 602 returning the data from the session in a call transfer RPC return signal. At this point, the SPA 601 can then close the session by sending a calling a close session function of the content provider 602. Similarly to how the content provider 602 opened the session, the content provider 602 can then return a close session call response to the SPA 601 to confirm the session is complete and send a GPIO or remote procedure call signal to secure processor 110 to put the secure processor 110 in a sleep state.

While the specification has been described in detail with respect to specific embodiments of the invention, it will be appreciated that those skilled in the art, upon attaining an understanding of the foregoing, may readily conceive of alterations to, variations of, and equivalents to these embodiments. The processors mentioned herein can individually include computer readable media accessible to those processors. The computer readable media can store instructions that are executable by the processors to cause the devices to execute the methods disclosed herein. Although examples in the disclosure were broadly directed to a dedicated device for entering a PIN, it can be understood that such device can be any device capable of executing the methods disclosed herein, such as POS devices, personal mobile devices, ATMs or any other device that benefits from the approaches disclosed. Although examples in the disclosure were directed to the process of entering a PIN, similar approaches can be applied to enter a password or other commands to interact with touch displays in modes other than PIN entry. These and other modifications and variations to the present invention may be practiced by those skilled in the art, without departing from the scope of the present invention, which is more particularly set forth in the appended claims.

What is claimed is:

1. A non-transitory computer-readable media having computer-readable instructions stored thereon which, when executed by one or more processors in a device, cause the one or more processors to:
provide, using a speaker on the device, an auditory cue;
initiate, after providing the auditory cue, a hold period of a predetermined duration;
receive, after initiating the hold period, a set of zero or more taps, sequentially, on a touch sensor of the device during the hold period;
determine a number of sequential taps in the set of zero or more taps;
store, after the conclusion of the hold period, a value in a sequence equal to the number of taps;
generate a value accepted signal after storing the number of taps, wherein the value accepted signal indicates an acceptance of the number of taps and;
repeat the provision of the auditory cue, initiation of the hold period, receipt of the zero or more taps, determination of the number of sequential taps, storage of the value, and generation of the value accepted signal in a cycle until the sequence has N digits.

2. The non-transitory computer-readable media of claim 1, wherein the one or more processors comprise a secure microcontroller, and wherein the number of taps is determined by the secure microcontroller.

3. The non-transitory computer-readable media of claim 2, wherein the one or more processors further comprise an applications processor, wherein the secure microcontroller transmits the value accepted signal to the applications processor after storing the value, and wherein the applications processor generates a notification indicating the acceptance of the number of taps.

4. The non-transitory computer-readable media of claim 3, wherein the notification comprises at least one of a second auditory cue or a digit received symbol presented on a display of the device.

5. The non-transitory computer-readable media of claim 1, wherein upon receiving the N digits, the one or more processors further execute computer-readable instructions to encrypt the sequence of the N digits after storing.

6. The non-transitory computer-readable media of claim 1, wherein the one or more processors further execute computer-readable instructions to:
  detect a touch up action on the touch sensor; and
  detect a touch down action on the touch sensor within a duration of time after detecting the touch up action,
  wherein the hold period is set based on the duration of time.

7. The non-transitory computer-readable media of claim 1, wherein the touch sensor is part of a touch display of the device, and wherein the touch display includes one or more tactile features surrounding the touch display to distinguish an edge of the touch display from a surface of the device.

8. The non-transitory computer-readable media of claim 1, wherein the one or more processors further execute computer-readable instructions to:
  transmit an accessibility sequence entry commencement command from an applications processor of the device to a secure microcontroller of the device; and
  route all data from the touch sensor directly to the secure microcontroller upon receiving the accessibility sequence entry commencement command at the secure microcontroller.

9. The non-transitory computer-readable media of claim 1, wherein:
  a tap is defined by a touch down action on a touch coordinate associated with the touch sensor followed by a touch up action within a predetermined period of time; and
  the touch coordinate associated with the touch sensor does not change during the predetermined period of time.

10. A device comprising:
  a speaker;
  a touch sensor;
  one or more memories having computer-readable instructions stored thereon; and
  one or more processors that execute the computer-readable instructions to:
    provide, using a speaker on the device, an auditory cue;
    initiate, after providing the auditory cue, a hold period of a predetermined duration;
    receive, after initiating the hold period, a set of zero or more taps, sequentially, on a touch sensor on the device during the hold period;
    determine a number of sequential taps in the set of zero or more taps;
    store, after the conclusion of the hold period, a value in a sequence equal to the number of taps;
    generate a value accepted signal after storing the number of taps, wherein the value accepted signal indicates an acceptance of the number of taps and;
    repeat the provision of the auditory cue, initiation of the hold period, receipt of the zero or more taps, determination of the number of sequential taps, storage of the value, and generation of the value accepted signal in a cycle until the sequence has N digits; and
    encrypt the sequence of the N digits.

11. The device of claim 10, wherein the one or more processors comprise a secure microcontroller, and wherein the number of taps is determined by the secure microcontroller.

12. The device of claim 11, wherein the one or more processors further comprise an applications processor, wherein the secure microcontroller transmits the value accepted signal to the applications processor after storing the value, and wherein the applications processor generates a notification indicating the acceptance of the number of taps.

13. The device of claim 12, wherein the notification comprises at least one of a second auditory cue or a digit received symbol presented on a display of the device.

14. The device of claim 10, wherein upon receiving the N digits, the one or more processors further execute computer-readable instructions to encrypt the sequence of the N digits after storing.

15. The device of claim 10, wherein the one or more processors further execute computer-readable instructions to:
  detect a touch up action on the touch sensor; and
  detect a touch down action on the touch sensor within a duration of time after detecting the touch up action,
  wherein the hold period is set based on the duration of time.

16. The device of claim 10, wherein the touch sensor is part of a touch display of the device, and wherein the touch display includes one or more tactile features surrounding the touch display to distinguish an edge of the touch display from a surface of the device.

17. The device of claim 10, wherein the one or more processors further execute computer-readable instructions to:
  transmit an accessibility sequence entry commencement command from an applications processor of the device to a secure microcontroller of the device; and
  route all data from the touch sensor directly to the secure microcontroller upon receiving the accessibility sequence entry commencement command at the secure microcontroller.

18. The device of claim 10, wherein:
  a tap is defined by a touch down action on a touch coordinate associated with the touch sensor followed by a touch up action within a predetermined period of time; and
  the touch coordinate associated with the touch sensor does not change during the predetermined period of time.

* * * * *